(12) United States Patent
Mariko et al.

(10) Patent No.: US 11,983,486 B1
(45) Date of Patent: May 14, 2024

(54) MACHINE LEARNING TECHNIQUES FOR UPDATING DOCUMENTS GENERATED BY A NATURAL LANGUAGE GENERATION (NLG) ENGINE

(71) Applicant: YSEOP SA, Lyons (FR)

(72) Inventors: Dominique Mariko, Paris (FR); Hugues Sézille de Mazancourt, Thiais (FR); Hanna Abi-Akl, Paris (FR); Estelle Rozenn Labidurie, Boulogne-Billancourt (FR)

(73) Assignee: YSEOP SA, Lyons (FR)

( * ) Notice: Subject to any disclaimer, the term of this patent is extended or adjusted under 35 U.S.C. 154(b) by 343 days.

(21) Appl. No.: 17/542,755

(22) Filed: Dec. 6, 2021

Related U.S. Application Data

(60) Provisional application No. 63/123,221, filed on Dec. 9, 2020.

(51) Int. Cl.
*G06F 40/30* (2020.01)
*G06F 40/166* (2020.01)
*G06F 40/56* (2020.01)
*G06N 5/045* (2023.01)

(52) U.S. Cl.
CPC ............ *G06F 40/166* (2020.01); *G06F 40/56* (2020.01); *G06N 5/045* (2013.01)

(58) Field of Classification Search
CPC .......... G06F 40/30; G06F 40/10; G06F 40/16; G06F 40/166; G06F 40/20; G06F 40/205; G06F 40/211; G06F 40/237; G06F 40/253; G06F 40/262; G06F 40/295; G06F 40/35; G06F 40/45; G06F 40/255; G06F 40/56

USPC ....................................... 704/9, 1, 4, 10, 257
See application file for complete search history.

(56) References Cited

U.S. PATENT DOCUMENTS

| | | | |
|---|---|---|---|
| 7,412,385 B2 | 8/2008 | Brockett et al. | |
| 7,546,235 B2 | 6/2009 | Brockett et al. | |
| 7,552,046 B2 | 6/2009 | Brockett et al. | |
| 7,584,092 B2 | 9/2009 | Brockett et al. | |
| 8,204,842 B1 | 6/2012 | Zhang et al. | |

(Continued)

OTHER PUBLICATIONS

International Search Report and Written Opinion for International Application No. PCT/IB2020/000359 dated Sep. 15, 2020.

(Continued)

*Primary Examiner* — Qi Han
(74) *Attorney, Agent, or Firm* — Wolf, Greenfield & Sacks, P.C.

(57) ABSTRACT

Described herein are techniques for automatically updating (e.g., augmenting) the content of documents with additional content. Such documents may be generated automatically using a natural language generation (NLG) engine. In some embodiments, the techniques developed by the inventors are configured to update a document with text explaining what caused a certain event or set of events described in the document. The techniques developed by the inventors involve multiple acts. For example, the techniques may identify content of relevance to a document, may identify whether the content includes a text segments having a causal structure, and may separate the cause sub-segment from the cause-segment. The cause sub-segment, and optionally the effect sub-segment, may be used to update the document.

20 Claims, 18 Drawing Sheets

(56) References Cited

U.S. PATENT DOCUMENTS

| | | |
|---|---|---|
| 8,825,474 B1 | 9/2014 | Zhai et al. |
| 9,135,244 B2 | 9/2015 | Reiter |
| 9,223,497 B2 | 12/2015 | Pasquero et al. |
| 9,996,524 B1 | 6/2018 | Hwang et al. |
| 10,339,470 B1 | 7/2019 | Dutta et al. |
| 10,943,072 B1 | 3/2021 | Jaganmohan |
| 11,210,473 B1 | 12/2021 | Mariko et al. |
| 2006/0009966 A1 | 1/2006 | Johnson et al. |
| 2006/0245641 A1 | 11/2006 | Viola et al. |
| 2007/0055491 A1 | 3/2007 | Manson et al. |
| 2009/0287476 A1 | 11/2009 | Johnson et al. |
| 2011/0184727 A1 | 7/2011 | Connor |
| 2014/0108304 A1 | 4/2014 | Heidasch |
| 2014/0156264 A1 | 6/2014 | Etzioni et al. |
| 2014/0188891 A1 | 7/2014 | Nath et al. |
| 2014/0310639 A1 | 10/2014 | Zhai et al. |
| 2015/0089409 A1 | 3/2015 | Asseily et al. |
| 2015/0169547 A1 | 6/2015 | Reiter |
| 2016/0364377 A1 | 12/2016 | Krishnamurthy |
| 2017/0357636 A1 | 12/2017 | Shafiulla et al. |
| 2018/0032505 A1 | 2/2018 | Hoetzer et al. |
| 2018/0143956 A1 | 5/2018 | Skarbovsky et al. |
| 2018/0196881 A1* | 7/2018 | Lundin ............... G06F 16/9535 |
| 2018/0217976 A1 | 8/2018 | Hwang et al. |
| 2018/0300311 A1 | 10/2018 | Krishnamurthy |
| 2019/0108338 A1* | 4/2019 | Saxe ................... G06F 21/562 |
| 2019/0311039 A1 | 10/2019 | Plant et al. |
| 2019/0318099 A1* | 10/2019 | Carvalho ................. G06N 3/08 |
| 2020/0057798 A1 | 2/2020 | Ragan, Jr. et al. |
| 2020/0184959 A1 | 6/2020 | Yasa et al. |
| 2020/0201897 A1 | 6/2020 | Palanciuc et al. |
| 2020/0233928 A1 | 7/2020 | Hane et al. |
| 2020/0356732 A1 | 11/2020 | Salmon et al. |
| 2020/0380075 A1 | 12/2020 | Boada et al. |
| 2020/0410011 A1 | 12/2020 | Shi et al. |

OTHER PUBLICATIONS

[No Author Listed], FNP 2022. The 4th Financial Narrative Processing Workshop. 2022. 7 pages. http://wp.lancs.ac.uk/cfie/fincausal2020/ (Last accessed Jul. 11, 2022).

Akl et al., Yseop at SemEval-2020 Task 5: Cascaded BERT Language Model for Counterfactual Statement Analysis. arXiv preprint arXiv:2005.08519. Nov. 13, 2020. 11 pages.

Cer et al., Universal sentence encoder. arXiv preprint arXiv:1803.11175. Apr. 12, 2018. 7 pages.

Danlos et al., EasyText: an operational NLG system. Proceedings of the 13th European Workshop on Natural Language Generation (ENLG). 2011:139-144.

Jäger et al., Formal language theory: refining the Chomsky hierarchy. Philosophical Transactions of the Royal Society B: Biological Sciences. Jul. 19, 2012;367(1598):1956-70.

Lafferty et al., Conditional random fields: Probabilistic models for segmenting and labeling sequence data. Proceedings of the Eighteenth International Conference on Machine Learning (ICML). 2001:282-289.

Li et al., Causality Extraction based on Self-Attentive BiLSTM-CRF with Transferred Embeddings. arXiv preprint arXiv:1904.07629. Nov. 8, 20120. 39 pages.

Mariko et al., Financial document causality detection shared task (fincausal 2020). arXiv preprint arXiv:2012.02505. Dec. 4, 2020. 10 pages.

Oard et al., Implicit feedback for recommender systems. Proceedings of the AAAI workshop on recommender systems. Jul. 27, 1998;83:3 pages.

Reinanda et al., Performance Comparison of Learning to Rank Algorithms for Information Retrieval. 2014 International Conference on Information, Communication Technology and System. 2014:3 pages. https://www.semanticscholar.org/paper/Performance-Comparison-of-Learning-to-Rank-for-Reinanda-Widyantoro/cd12e191d2c2790e5ed60e5186462e6f8027db1f?citingPapersSort=relevance&citingPapersLimit=10&citingPapersOffset=0&year%5B0%5D=&year%5B1%5D=&citedPapersSort=relevance&citedPapersLimit=10&citedPapersOffset=10#paper-header [last accessed Sep. 4, 2020].

Reiter, Has a consensus NL generation architecture appeared, and is it psycholinguistically plausible?. ArXiv preprint cmp-lg/9411032. Nov. 30, 1994:1-9.

Roche et al., Finite-state language processing. MIT press. 1997. 474 pages.

Silberztein, Syntactic parsing with NooJ. HAL archives-ouvertes. Jul. 6, 2010:1-14.

Vaswani et al., Attention is all you need. ArXiv preprint arXiv:1706.03762v5. Dec. 6, 2017;5:1-15.

\* cited by examiner

FIG. 3

302 — Select a category ▾

Groupe [2017] to [2019]

| Indicator | 2019 $k | 2018 $k |
|---|---|---|
| Cash And Cash Equivalents | 25,844 | 29,207 |
| ▲ Current Assets | 98,236 | 96,767 |
| ▲ Total Assets | 123,876 | 122,414 |
| Share Capital | | 11,324 |
| Total Equity | 80,551 | 76,089 |
| Provisions | 1,076 | 1,418 |
| Bond loan | | |
| Other Financial Debts | | 146 |
| Loans + Debts/ST ETS (1) > 2 years | | |
| ▲ MLT debts from credit institutions | 12,443 | 16,001 |
| ▲ MLT debts | 12,443 | 16,147 |
| Partner current account | | |
| ▲ Accrued Expenses And Other | 29,807 | 28,760 |
| Non-operating debt | | |
| ▲ Other Debts | 42,250 | 44,907 |
| ▲ Total debts | 123,877 | 122,414 |
| ▲ Total Equity And Liabilities | 0 | 0 |
| Leverage | - | - |

306 — REPORT OUTLINE | REPORT PREVIEW

During the last two fiscal years, revenue remained stable at €103.31M.

We can observe that between 2018 and 2019, the increase of 3.3% of sales is significantly inferior to the growth of 10.4% of EBITDA on the same period of time in 2019, the EBITDA margin grew (+6.8%) after a decrease (-30.6%) in 2018. These two expense rubrics the most important are:

- Administrative expenses paid off (597.3%) to €19.55M.
- Consumed purchases of materials and goods were stable at €41.14M.

Nevertheless, operating profit climbed (+29.5%) to €7.37M. Interest charge went down (146%) to €610K over the last fiscal year.

Non recurring net income increased by €133K to €150K. Net profit grew by 28.9% to €6.15M in 2019. Moreover, profit margin ratio improved to 5.9% from 4.8%, a 118 bps increase.

Balance sheet — 304

| In €K | 31/12/2017 | 31/12/2018 | 31/12/2019 | Variation % |
|---|---|---|---|---|
| Reserves for possible losses | 1 468 000 | 1 418 000 | 1 076 000 | -24.1% |
| Total equity & liabilities | 110 029 000 | 122 414 000 | 123 877 000 | +1.2% |
| Total equity | 77 046 000 | 76 089 000 | 80 551 000 | +5.9% |
| Share capital | 11 324 000 | 11 324 000 | - | - |
| Funding liabilities | 31 515 000 | 44 907 000 | 42 250 000 | -5.9% |

REFRESH | OPEN IN NEW TAB

| Section | Financial indicator | Semantic object | Trigger condition(s) | Result | Warning description |
|---|---|---|---|---|---|
| Income statement | EBITDA | DescribeValueContributors | Always | Warning: If available, detail the structure of EBITDA geographically or per BU | Describe EBITDA trend evolution on the available period (3-5 years). If available, detail the structure of EBITDA geographically or per business unit. |
| Income statement | EBIT | DescribeVariation | If recurrent (+/- 15%) | Warning: Explain the origin of the important variation of EBIT recurring | Explain the elements impacting the variation of recurring EBIT. |
| Income statement | Net Income | DescribeValue and DescribeVariation | If recurrent (+/- 10%) | Warning: Explain the variation | What are the reasons for the augmentation of this exceptional result |
| Income statement | Share of associates (P/L) | Describe the value | Significative variation +/-10% | Warning: Explain the variation | Explain the variation (over 10%), concentration risk and main contributors to dividends. |

FIG. 4A

| Select a category | ∨ | | |
|---|---|---|---|
| Groupe 2017 to 2019 | | | |
| Indicator | | 2019 $k | 2018 $k |
| Cash And Cash Equivalents | | 25,844 | 29,207 |
| ▲Current Assets | | 98,236 | 96,767 |
| ▲Total Assets | | 123,876 | 122,414 |
| Share Capital | | | 11,324 |
| Total Equity | | 80,551 | 76,089 |
| Provisions | | 1,076 | 1,418 |
| Bond loan | | | |
| Other Financial Debts | | | 146 |
| Loans + Debts/ST ETS (1) > 2 years | | | |
| ▲MLT debts from credit institutions | | 12,443 | 16,001 |
| ▲MLT debts | | 12,443 | 16,147 |
| Partner current account | | | |
| ▲Accrued Expenses And Other | | | |
| Non-operating debt | | | |
| ▲Other Debts | | 29,807 | 28,760 |
| ▲Total debts | | 42,250 | 44,907 |
| ▲Total Equity And Liabilities | | 123,877 | 122,414 |
| Leverage | | 0 | 0 |

REPORT OUTLINE | REPORT PREVIEW

During the last two fiscal years, revenue remained stable at €103.31M.

We can observe that between 2018 and 2019, the increase of 3.3% of sales is significantly inferior to the growth of 10.4% of EBITDA on the same period of time In 2019, the EBITDA margin grew (+6.6%) after a decrease (-30.6%) in 2018. These two expense rubrics the most important are:

- Administrative expenses paid off (597.3%) to €19.55M.
- Consumed purchases of materials and goods were stable at €41.14M.

Nevertheless, operating profit climbed (+29.5%) to €7.37M. Interest charge went down (146%) to €610K over the last fiscal year. *What are the financial products composed of? Is this product considered as exceptional? Is it latent gains?* ← First warning message Non recurring net income increased by €133K to €150K. *What are the reasons for the augmentation of the exceptional result?* Net profit grew by 28.9% to €6.15M in 2019. ← Second warning message Moreover, profit margin ratio improved to 5.9% from 4.8%, a 118 bps increase.

Balance sheet

| In € K | 31/12/2017 | 31/12/2018 | 31/12/2019 | Variation % |
|---|---|---|---|---|
| Reserves for possible losses | 1 468 000 | 1 418 000 | 1 076 000 | -24.1% |
| Total equity & liabilities | 110 029 000 | 122 414 000 | 123 877 000 | +1.2% |
| Total equity | 77 046 000 | 76 089 000 | 80 551 000 | +5.9% |
| Share capital | 11 324 000 | 11 324 000 | - | - |
| Funding liabilities | 31 515 000 | 44 907 000 | 42 250 000 | -5.9% |

REFRESH | OPEN IN NEW TAB

GREAT NECK, N.Y., March 17, 2020 (GLOBE NEWSWIRE) - Acme Corps, Inc. (Nasdaq: LOAN) announced today that net income for the year ended December 31, 2019 was approximately 150K, or $0.47 per share (based on approximately 9.7 million weighted-average outstanding common shares), versus approximately $133K, or $0.48 per share (based on approximately 8.8 million weighted-average outstanding common shares) for the year ended December 31, 2018, an increase of $17,000 or 13.3.0%. This increase in net income was mainly due to an increase in operating income and decreases in interest and payroll expenses.

Total revenue for the year ended December 31, 2019 was approximately $7,340,000 compared to approximately $7,225,000 for the year ended December 31, 2018, an increase of $115,000 or 1.6%. The increase in revenue was primarily attributable to an increase in origination fees resulting from an increase in the rate of loan turnover. In 2019, approximately $6,186,000 of our revenue represents interest income on secured, real estate loans that we offer to small businesses compared to approximately $6,168,000 in 2018, and approximately $1,154,000 represents origination fees on such loans compared to approximately $1,057,000 in 2018.

FIG. 5

GREAT NECK, N.Y., March 17, 2020 (GLOBE NEWSWIRE) - Acme Corps, Inc. (Nasdaq: LOAN) announced today that net income for the year ended December 31, 2019 was approximately 150K, or $0.47 per share (based on approximately 9.7 million weighted-average outstanding common shares), versus approximately $133K, or $0.48 per share (based on approximately 8.8 million weighted-average outstanding common shares) for the year ended December 31, 2018, an increase of $17,000 or 13.3.0%. This increase in net income was mainly due to an increase in operating income and decreases in interest and payroll expenses.
Total revenue for the year ended December 31, 2019 was approximately $7,340,000 compared to approximately $7,225,000 for the year ended December 31, 2018, an increase of $115,000 or 1.6%. The increase in revenue was primarily attributable to an increase in origination fees resulting from an increase in the rate of loan turnover. In 2019, approximately $6,186,000 of our revenue represents interest income on secured, real estate loans that we offer to small businesses compared to approximately $6,168,000 in 2018, and approximately $1,154,000 represents origination fees on such loans compared to approximately $1,057,000 in 2018.

FIG. 6

Cause: an increase in operating income and decreases in interest and payroll expenses Effect: The increase in net income Cause: an increase in origination fees resulting from an increase in the rate of loan turnover Effect: The increase in revenue

FIG. 7

REPORT OUTLINE | REPORT PREVIEW

During the last two fiscal years, revenue remained stable at €103.31M.

We can observe that between 2018 and 2019, the increase of 3.3% of sales is significantly inferior to the growth of 10.4% of EBITDA on the same period of time. In 2019, the EBITDA margin grew (+6.8%) after a decrease (-30.6%) in 2018. These two expense rubrics the most important are:

- Administrative expenses paid off (597.3%) to €19.55M.
- Consumed purchases of materials and goods were stable at €41.14M.

Nevertheless, operating profit climbed (+29.5%) to €7.37M. Interest charge went down (146%) to €610K over the last fiscal year. *What are the financial products composed of? Is this product considered as exceptional? Is it latent gains?*

Non recurring net income increased by €133K to €150K. *What are the reasons for the augmentation of the exceptional result?* Net profit grew by 28.9% to €6.15M in 2019. Moreover, profit margin ratio improved to 5.9% from 4.8%, a 118 bps increase.

Balance s

| In € K | | |
|---|---|---|
| Reserves | | |
| Total equity | | |
| Total equ | | |
| Share cap | | |
| Funding | | |

This increase in net income was mainly due to an increase in operating income and decreases in interest and payroll expenses 3 news sources [link]

Successful launch of new product AcmeRocket had a short-term major effect on net income 10K 2019 report [link]

See more ...

[ REFRESH ]   [ OPEN IN NEW TAB ]

FIG. 9

REPORT OUTLINE | REPORT PREVIEW

During the last two fiscal years, revenue remained stable at €103.31M.

We can observe that between 2018 and 2019, the increase of 3.3% of sales is significantly inferior to the growth of 10.4% of EBITDA on the same period of time. In 2019, the EBITDA margin grew (+6.8%) after a decrease (-30.6%) in 2018. Thes two expense rubrics the most important are:

- Administrative expenses paid off (597.3%) to €19.55M.
- Consumed purchases of materials and goods were stable at €41.14M.

Nevertheless, operating profit climbed (+29.5%) to €7.37M. Interest charge went down (146%) to €610K over the last fiscal year. *What are the financial products composed of? Is this product considered as exceptional? Is it latent gains?*

Non recurring net income increased by €133K to €150K due to an increase in operating income, decreases in interest and payroll expenses and successful launch of new product AcmeRocket.

Net profit grew by 28.9% to €6.15M in 2019. Moreover, profit margin ratio improved to 5.9% from 4.8%, a 118bps increase.

Balance sheet

| In € K | 31/12/2017 | 31/12/2018 | 31/12/2019 | Variation % |
|---|---|---|---|---|
| Reserves for possible losses | 1 468 000 | 1 418 000 | 1 076 000 | -24.1% |
| Total equity & liabilities | 110 029 000 | 122 414 000 | 123 877 000 | +1.2% |
| Total equity | 77 046 000 | 76 089 000 | 80 551 000 | +5.9% |
| Share capital | 11 324 000 | 11 324 000 | - | - |
| Funding liabilities | 31 515 000 | 44 907 000 | 42 250 000 | -5.9% |

REFRESH     OPEN IN NEW TAB

MACHINE LEARNING TECHNIQUES FOR UPDATING DOCUMENTS GENERATED BY A NATURAL LANGUAGE GENERATION (NLG) ENGINE

CROSS-REFERENCE TO RELATED APPLICATION

This application claims priority under 35 U.S.C. § 119(e) to U.S. Provisional Patent Application Ser. No. 63/123,221, entitled "MACHINE LEARNING TECHNIQUES FOR UPDATING DOCUMENTS GENERATED BY A NATURAL LANGUAGE GENERATION (NLG) ENGINE," filed on Dec. 9, 2020, which is hereby incorporated herein by reference in its entirety.

FIELD

The techniques described herein relate to the field of automatic generation of natural language text, and more particularly to machine learning techniques for updating (e.g., augmenting) documents generated by a natural language generation (NLG) engine.

BACKGROUND

Natural language generation (NLG) is the generation of human-language text based on information in non-linguistic form. For example, natural language generation techniques may be used to generate a report for a business based on financial data about the business, to generate a textual description of a day of trading of a particular stock based on data indicating the price of the stock throughout the day, to generate a confirmation e-mail for an online purchase made via the Internet based on data describing the purchase, to generate real-time comments about a sporting even using data about the game, or to generate text for a chatbot for communicating with a customer based on data about the customer.

SUMMARY

Some embodiments relate to a method for updating document content, the method comprising using at least one computer hardware processor to perform: identifying a first text segment in a document to be updated with additional content; identifying, using the first text segment, content from at least one data source, the content including a plurality of content segments; identifying, using a first machine learning model and from among the plurality of content segments, at least one causal text segment having a causal structure, the at least one causal text segment including a first causal text segment; identifying, using a second machine learning model different from the first machine learning model, cause and effect sub-segments of the first causal text segment; generating a second text segment for use in updating the document by using the cause sub-segment; and updating the document using the second text segment.

In some embodiments, identifying the first text segment is performed using at least one rule for determining when content of the first text segment is to be augmented with additional content.

In some embodiments, identifying the first text segment using the at least one rule comprises determining that the first text segment is to be augmented with additional content when the first text segment includes text about a value of a financial indicator.

In some embodiments, identifying the first segment in the document comprises: presenting a graphical user interface (GUI) to a user indicating one or more text segments including the first text segment; and receiving input, through the GUI, indicating that the user has selected the first text segment.

In some embodiments, the document comprises a plurality of text segments including the first text segment, wherein each of the plurality of text segments is associated with a respective semantic object, and wherein: identifying the first segment in the document comprises identifying at least one of the plurality of text segments that is associated with a particular semantic object.

In some embodiments, the first text segment comprises text relating to a financial indicator, and wherein identifying content from at least one data source comprises searching through the at least one data source using at least some of the text relating to the financial indicator.

In some embodiments, identifying, using the first machine learning model and from among the plurality of content segments, the at least one causal text segment having a causal structure comprises: tokenizing at least some of the plurality of content segments to produce a plurality of tokens; and providing the plurality of tokens as input to the first machine learning model to obtain an output indicative of whether the at least some of the plurality of content segments has a causal structure.

In some embodiments, the first machine learning model comprises a binary classifier configured to identify whether a content segment has a causal structure.

In some embodiments, the classifier comprises a neural network.

In some embodiments, the neural network comprises a recurrent neural network.

In some embodiments, the recurrent neural network comprises a long short-term memory (LSTM) neural network.

In some embodiments, the LSTM neural network comprises a bi-directional LSTM neural network.

In some embodiments, the neural network comprises at least ten million parameters.

In some embodiments, the neural network comprises at least fifty million parameters.

In some embodiments, the neural network comprises between ten million and two hundred million parameters.

In some embodiments, processing the first causal text segment, using the second machine learning model, to identify cause and effect sub-segments of the first causal text segment comprises: tokenizing the first causal text segment to produce a plurality of tokens; generating a plurality of tags by tagging the plurality of tokens in accordance with an inside, outside, beginning (IOB) format; and providing the plurality of tokens and associated tags as input to the second machine learning model to obtain an output indicating the cause and effect sub-segments.

In some embodiments, the second machine learning model comprises a neural network.

In some embodiments, the neural network comprises a recurrent neural network.

In some embodiments, the recurrent neural network comprises a long short-term memory (LSTM) neural network.

In some embodiments, the LSTM neural network comprises a bi-directional LSTM neural network.

In some embodiments, the neural network comprises a conditional random field (CRF) model.

In some embodiments, generating the second text segment comprises using a third machine learning model different from the first machine learning model and from the second machine learning model.

In some embodiments, the third machine learning model is configured to generate the second text segment by paraphrasing the cause and effect sub-segments.

In some embodiments, the third machine learning model comprises a neural network.

In some embodiments, the neural network comprises a recurrent neural network.

In some embodiments, the recurrent neural network comprises an LSTM neural network.

In some embodiments, generating the second text segment for use in updating the document by using the cause sub-segment comprises generating the second text segment for use in updating the document by using the cause sub-segment and at least one of the effect sub-segment and the first text segment.

In some embodiments, the method further comprises determining whether the effect sub-segment is related to the first text segment, wherein generating the second text segment is performed when it is determined that the effect sub-segment is related to the first text segment.

In some embodiments, determining whether the effect sub-segment is related to the first text segment comprises determining whether the effect sub-segment and the first text segment comprise a common financial indicator.

In some embodiments, determining whether the effect sub-segment is related to the first text segment comprises: presenting a graphical user interface (GUI) to a user indicating a plurality of candidate effect sub-segments including the effect sub-segment; and obtaining user input indicating that the effect sub-segment is related to the first text segment.

In some embodiments, determining whether the effect sub-segment is related to the first text segment comprises: determining an accuracy score for the at least one data source; and determining whether the effect sub-segment is related to the first text segment using the accuracy score.

In some embodiments, the second text segment comprises text corresponding to the cause sub-segment, and wherein updating the document using the second text segment comprises adding the second text segment to the document.

In some embodiments, the second text segment comprises the cause sub-segment, and wherein adding the second text segment to the document comprises adding the cause sub-segment to the document.

In some embodiments, updating the document using the second text segment further comprises adding a causal conjunction to the document.

In some embodiments, the second text segment comprises text corresponding to the cause sub-segment and text corresponding to the effect sub-segment, and wherein updating the document using the second text segment comprises replacing the first text segment with the second text segment.

In some embodiments, the second text segment comprises the cause sub-segment and the effect sub-segment, and wherein replacing the first text segment with the second text segment comprises replacing the first text segment with the cause sub-segment and the effect sub-segment.

Some embodiments relate to a system for updating document content, the system comprising at least one computer hardware processor to perform: identifying a first text segment in a document to be updated with additional content; identifying, using the first text segment, content from at least one data source, the content including a plurality of content segments; identifying, using a first machine learning model and from among the plurality of content segments, at least one causal text segment having a causal structure, the at least one causal text segment including a first causal text segment; identifying, using a second machine learning model different from the first machine learning model, cause and effect sub-segments of the first causal text segment; generating a second text segment for use in updating the document by using the cause sub-segment; and updating the document using the second text segment.

Some embodiments relate to at least one non-transitory computer-readable storage medium storing processor-executable instructions that, when executed by at least one processor, cause the at least one processor to perform a method for updating document content, the method comprising: identifying a first text segment in a document to be updated with additional content; identifying, using the first text segment, content from at least one data source, the content including a plurality of content segments; identifying, using a first machine learning model and from among the plurality of content segments, at least one causal text segment having a causal structure, the at least one causal text segment including a first causal text segment; identifying, using a second machine learning model different from the first machine learning model, cause and effect sub-segments of the first causal text segment; generating a second text segment for use in updating the document by using the cause sub-segment; and updating the document using the second text segment.

The foregoing is a non-limiting summary of the technology described in this application, which is defined by the attached claims.

BRIEF DESCRIPTION OF DRAWINGS

Various aspects and embodiments of the disclosure provided herein are described below with reference to the following figures. Items appearing in multiple figures are indicated by the same or a similar reference number in all the figures in which they appear.

FIG. 3 illustrates an input document including a plurality of natural language text segments, in accordance with some embodiments of the technology described herein.

FIG. 4A is a table illustrating representative rules that may be used to identify text to be updated with additional content, in accordance with some embodiments of the technology described herein.

FIG. 4B illustrates the input document of FIG. 3 and further includes two example warning messages, in accordance with some embodiments of the technology described herein.

FIGS. 4D-4E illustrate representative search APIs, in accordance with some embodiments of the technology described herein.

FIG. 5 illustrates content identified from a data source, in accordance with some embodiments of the technology described herein.

FIG. 6 illustrates the content of FIG. 6, where the highlighted text segments represent causal text segments, in accordance with some embodiments of the technology described herein.

FIG. 7 illustrates two pairs of cause and effect sub-segments, in accordance with some embodiments of the technology described herein.

FIG. 9 illustrates the document of FIG. 4C and further includes possible cause sub-sentences, in accordance with some embodiments of the technology described herein.

FIG. 10 illustrates an updated version of the input document of FIG. 3, in accordance with some embodiments of the technology described herein.

DETAILED DESCRIPTION

I. Overview

Figure 1A:
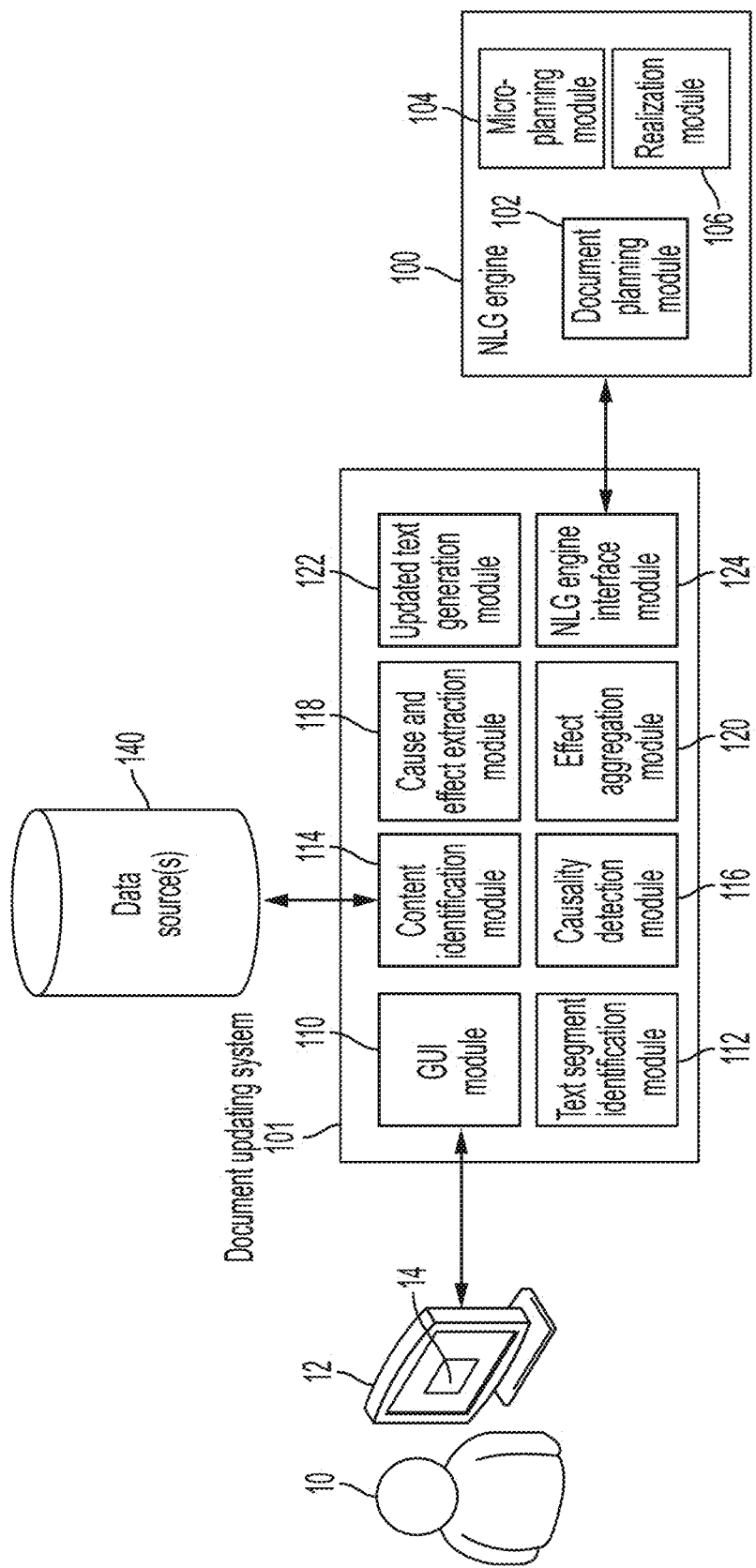
FIG. 1A is a diagram illustrating a system for updating documents including a natural language generation engine, one or more data sources and a document updating system, in accordance with some embodiments of the technology described herein.

Described herein are techniques for automatically updating (e.g., augmenting) the content of documents with additional content. Such documents may be generated automatically using a natural language generation (NLG) engine. However, in some embodiments, other documents may be processed using the techniques described herein. The inventors have appreciated that users of NLG engines would benefit from having the ability to update a document with content that may not be readily available to them. For example, the inventors have appreciated that users of NLG engines would benefit from having the ability to update a document with text explaining what caused a certain event or set of events described in the document to occur.

Conventionally, a user operates an NLG engine in the following manner. First, the user provides structured data of interest to the user to an NLG engine. Then, the user requests that the NLG engine generate a document including natural language text reflecting the user's data. Lastly, the NLG engine generates a document by transforming the user's data into natural language. Consider for example how some financial reports are generated using NLG. Suppose that a financial analyst wishes to generate, for the benefits of the analyst's clients, a report outlining financial information about a particular organization or a particular industry for the third quarter of the current fiscal year. Additionally, suppose that the financial analyst—in addition (or in alternative) to presenting elaborate charts, income statements, balance sheets, etc.—wishes to present a summary of the financial information in natural language text (e.g., in plain English). The financial analyst recognizes that presenting such an easy-to-read summary could potentially broaden the analyst's readership. Conventionally, the financial analyst would obtain financial information to be summarized in natural language from various sources, and would provide the financial information so obtained to an NLG engine. The NLG engine would then generate a financial report that the analyst can share with the analyst's clients including natural language text summarizing the financial information.

The inventors have appreciated that the financial analyst may benefit from the ability to augment financial reports with information explaining what caused a particular event or set of events to occur. For example, suppose that an NLG engine has generated a financial report describing, in natural language text, that the net income of a particular company has decreased by 40% in 2019. However, the report does not explain why this was the case. Notwithstanding, a reader may find it useful to understand what caused the company's net profit to drop. Understanding such cause(s) would give the reader some additional insight as to whether the net profit drop was expected or unexpected, was unique to the company or was experienced to some extent throughout the industry, so that the reader may take appropriate measures (e.g., sell shares of the company). There is one challenge, however: information explaining the cause(s) of a particular event may not be readily available to the financial analyst. Further, the financial analyst may not even know, prior to the generation of the financial report, which events would benefit from being augmented with causes explaining their occurrences.

The inventors have developed techniques for updating (e.g., augmenting) documents generated using an NLG engine with additional content. In some embodiments, the techniques developed by the inventors are configured to update a document with text explaining what caused a certain event or set of events described in the document. The techniques developed by the inventors involve multiple acts. First, the techniques developed by the inventors involve automatically identifying text segments (e.g., sentences) of a document to be updated with additional content. This may be advantageous because the user may not know a priori which event(s) would benefit from being explained by a corresponding cause. In one example, a text segment of a particular financial report describing that the net earnings of Company X have decreased in 2019 may be identified at this stage. Second, these techniques are configured to search data sources (e.g., publicly accessible databases) for relevant content that could potentially explain the cause of that event. This may be advantageous because the user may not know a priori what might have caused this event. In one example, a database storing financial information (e.g., Bloomberg.com) may be searched at this stage to identify content that may explain the decrease in net earnings experienced by Company X. Third, these techniques are configured to process such relevant content to automatically identify content segments (e.g., sentences) having a causal structure. In some embodiments, this identification may be performed using a first machine learning model. A content segment has a causal structure if it includes an effect sub-segment and a cause sub-segment such that the occurrence of the cause sub-segment caused the occurrence of the effect sub-segment. For example, at this stage, the techniques may identify, from Bloomberg.com, a sentence describing that the net profits of Company X have dropped by 40% in 2019 due to an unexpected increase in the price of energy. Fourth, these techniques involve automatically separating the effect sub-segment from the cause sub-segment, which in some embodiments is performed using a second machine learning model. For example, at this stage, the sub-segment describing the net profit drop (the effect sub-segment) is separated from the sub-segment describing the energy price increase (the cause sub-segment). In some embodiments, prior to updating the document, these techniques may confirm whether the identified effect sub-segment is in fact related to the text segment to be updated. For example, it may be confirmed whether Company X's 40% net profit drop is related to Company X's net earnings decrease. Fifth, these techniques involve generating a new text segment including text describing the cause of a particular event described in the document. For example, the new sentence may describe that Company X experienced a decrease in net earnings in 2019 as a result of an increase in the price of energy. In some embodiments, this act may involve rephrasing text, which may be performed using a third machine learning model. Lastly, the techniques developed by the inventors involve updating the document using the new text segment.

Accordingly, in some embodiments, the inventors have developed natural language generation techniques that involve 1) identifying a first text segment in a document (e.g., report) to be updated with additional content; 2) identifying, using the first text segment, content from at least one data source, the content including a plurality of content segments; 3) identifying, using a first machine learning model and from among the plurality of content segments, at least one causal text segment having a causal structure, the at least one causal text segment including a first causal text segment; 4) identifying, using a second machine learning model different from the first machine learning model, cause and effect sub-segments of the first causal text segment; 5) generating a second text segment for use in updating the document by using the cause sub-segment; and 6) updating the document using the second text segment.

In some embodiments, identifying the first text segment is performed using at least one rule for determining when content of the first text segment is to be augmented with additional content. In some embodiments, identifying the first text segment using the at least one rule comprises determining that the first text segment is to be augmented with additional content when the first text segment includes text about a value of a financial indicator. In some embodiments, identifying the first segment in the document comprises: presenting a graphical user interface (GUI) to a user indicating one or more text segments including the first text segment; and receiving input, through the GUI, indicating that the user has selected the first text segment. In some embodiments, the document comprises a plurality of text segments including the first text segment, and each of the plurality of text segments is associated with a respective semantic object; in these embodiments, identifying the first segment in the document comprises identifying at least one of the plurality of text segments that is associated with a particular semantic object.

In some embodiments, the first text segment comprises text relating to a financial indicator, and wherein identifying content from at least one data source comprises searching through the at least one data source using at least some of the text relating to the financial indicator.

In some embodiments, identifying, using the first machine learning model and from among the plurality of content segments, the at least one causal text segment having a causal structure comprises tokenizing at least some of the plurality of content segments to produce a plurality of tokens; and providing the plurality of tokens as input to the first machine learning model to obtain an output indicative of whether the at least some of the plurality of content segments has a causal structure. In some embodiments, the first machine learning model comprises a binary classifier configured to identify whether a content segment has a causal structure. In some embodiments, the classifier comprises a neural network. In some embodiments, the neural network comprises a recurrent neural network. In some embodiments, the recurrent neural network comprises a long short-term memory (LSTM) neural network. In some embodiments, the LSTM neural network comprises a bi-directional LSTM neural network. In some embodiments, the neural network comprises at least ten million parameters. In some embodiments, the neural network comprises at least fifty million parameters. In some embodiments, the neural network comprises between ten million and two hundred million parameters.

In some embodiments, processing the first causal text segment, using the second machine learning model, to identify cause and effect sub-segments of the first causal text segment comprises tokenizing the first causal text segment to produce a plurality of tokens; generating a plurality of tags by tagging the plurality of tokens in accordance with an inside, outside, beginning (IOB) format; and providing the plurality of tokens and associated tags as input to the second machine learning model to obtain an output indicating the cause and effect sub-segments. In some embodiments, the second machine learning model comprises a neural network. In some embodiments, the neural network comprises a recurrent neural network. In some embodiments, the recurrent neural network comprises a long short-term memory (LSTM) neural network. In some embodiments, the LSTM neural network comprises a bi-directional LSTM neural network. In some embodiments, the neural network comprises a conditional random field (CRF) model.

In some embodiments, generating the second text segment comprises using a third machine learning model different from the first machine learning model and from the second machine learning model. In some embodiments, the third machine learning model is configured to generate the second text segment by paraphrasing the cause and effect sub-segments. In some embodiments, the third machine learning model comprises a neural network. In some embodiments, the neural network comprises a recurrent neural network. In some embodiments, the recurrent neural network comprises an LSTM neural network.

In some embodiments, generating the second text segment for use in updating the document by using the cause sub-segment comprises generating the second text segment for use in updating the document by using the cause sub-segment and at least one of the effect sub-segment and the first text segment.

In some embodiments, the method further comprises determining whether the effect sub-segment is related to the first text segment, wherein generating the second text segment is performed when it is determined that the effect sub-segment is related to the first text segment. In some embodiments, determining whether the effect sub-segment is related to the first text segment comprises determining whether the effect sub-segment and the first text segment comprise a common financial indicator. In some embodiments, determining whether the effect sub-segment is related to the first text segment comprises presenting a graphical user interface (GUI) to a user indicating a plurality of candidate effect sub-segments including the effect sub-segment; and obtaining user input indicating that the effect sub-segment is related to the first text segment. In some embodiments, determining whether the effect sub-segment is related to the first text segment comprises determining an accuracy score for the at least one data source; and determining whether the effect sub-segment is related to the first text segment using the accuracy score.

In some embodiments, the second text segment comprises text corresponding to the cause sub-segment, and wherein updating the document using the second text segment comprises adding the second text segment to the document. In some embodiments, the second text segment comprises the cause sub-segment, and wherein adding the second text segment to the document comprises adding the cause sub-segment to the document. In some embodiments, the second text segment comprises text corresponding to the cause sub-segment and text corresponding to the effect sub-segment, and wherein updating the document using the second text segment comprises replacing the first text segment with the second text segment. In some embodiments, the second text segment comprises the cause sub-segment and the effect sub-segment, and wherein replacing the first text segment with the second text segment comprises replacing the first text segment with the cause sub-segment and the effect sub-segment.

Following below are more detailed descriptions of various concepts related to, and embodiments of, updating document content. It should be appreciated that various aspects described herein may be implemented in any of numerous ways. Examples of specific implementations are provided herein for illustrative purposes only. In addition, the various aspects described in the embodiments below may be used alone or in any combination and are not limited to the combinations explicitly described herein.

II. Systems and Processes for Updating Document Content

FIG. 1A is a diagram illustrating a system for natural language generation including an NLG engine 100, a document updating system 101 and data source(s) 140. NLG engine 100 comprises software modules configured to analyze structured data and, building upon the data, generate natural language text. Document updating system 101 comprises one or more software modules configured to update (e.g., augment) documents (e.g., documents including text in natural language) with additional content. Document updating system 101 identifies content for updating a document from data source(s) 140.

Document updating system 101 includes a GUI module 110, a text segment identification module 112, a content identification module 114, a causality detection module 116, a cause and effect extraction module 118, an effect aggregation module 120, an updated text generation module 122 and an NLG engine interface module 124. GUI module 110 enables communication with GUIs that may be presented to users. In the diagram of FIG. 1A, user 10 interacts with a GUI 14 presented in a computing system 12. GUI 14 is in communication with GUI module 110. For example, GUI module 110 may present different natural language text options describing various sets of facts to user 12, and may ask the user to select one of the options. When a user 10 makes a selection, GUI 14 may communicate the selection to GUI module 110.

Modules of the types described herein may comprise processor-executable instructions that, when executed by at least one processor, cause the at least one processor to perform a certain act. For example, as described in detail further below, micro-planning module 104, which may be configured to perform a micro-planning stage of NLG in some embodiments, may comprise processor executable instructions that, when executed by at least one processor, cause the at least one processor to perform a micro-planning stage of NLG.

NLG engine 100 may transform information presented in non-linguistic form into human language text using multiple stages of processing. NLG engine 100 may obtain the information presented in non-linguistic form from user 10 or from any other source. NLG engine 100 includes a document planning module 102, a micro-planning module 104 and a realization module 106. Document planning module 102 performs a document planning stage, micro-planning module 104 performs a micro-planning stage and realization module 106 performs a realization stage. Document updating system 101 may assist NLG engine 100 in any one of the NLG stages.

Figure 1B:
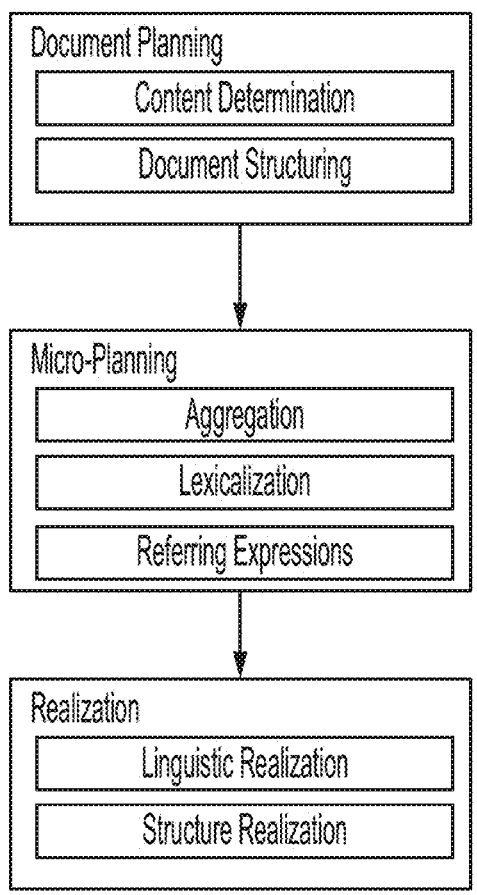
FIG. 1B is a diagram illustrating processing stages of natural language generation, in accordance with some embodiments of the technology described herein.

As further illustrated in FIG. 1B, the document planning stage may include a content determination stage and a document structuring stage. In the content determination stage, NLG engine 100 may obtain content to be expressed in natural language text, for example from user 10 or from another source. In the document structuring stage, NLG engine 100 may determine the rhetorical structure of the text to be generated. For example, to generate natural language text about the finances of a particular company, information about the finances of that company may be obtained in the content determination stage (e.g., information indicating the company's sales and information indicating the company's profits) and organized for presentation in the document structuring stage (e.g., by determining that information indicating the company's sales should be presented before information indicating the company's profits). Document planning module 102 may be configured to organize how information will be presented accordingly.

Micro-planning module 104 may be configured to perform a micro-planning stage of NLG which may involve determining, based at least in part on the document plan, a syntactic structure for the text to be generated. The micro-planning stage may include an aggregation stage, a lexicalization stage, and a referring expression stage. The aggregation stage may involve determining boundaries between sentences. The lexicalization stage may involve choosing words to describe particular concepts to be expressed in the text to be generated. The referring expression stage may involve selecting expressions, for use in the text to be generated, to refer to concepts that appear more than once in the text (e.g., selecting the pronoun "it" to refer to "the company" in a portion of the text to be generated).

Realization module 106 may be configured to perform a realization stage of NLG which may involve transforming the syntactic structure of the document to be generated into text. The realization stage includes a linguistic realization stage and a structural realization stage. The linguistic realization stage may involve generating actual text according to rules of syntax, morphology, and orthography, and may include putting words in order, conjugating verbs, ensuring adjective-noun agreement, etc. During the structural realization stage, the text generated in the linguistic realization stage may be output in a desired format (e.g., a PDF file, an XML file, etc.). The above-described tasks may be performed by NLG engine 100 sequentially in stages, as shown in FIG. 1B, or in any other suitable way.

Figure 2:
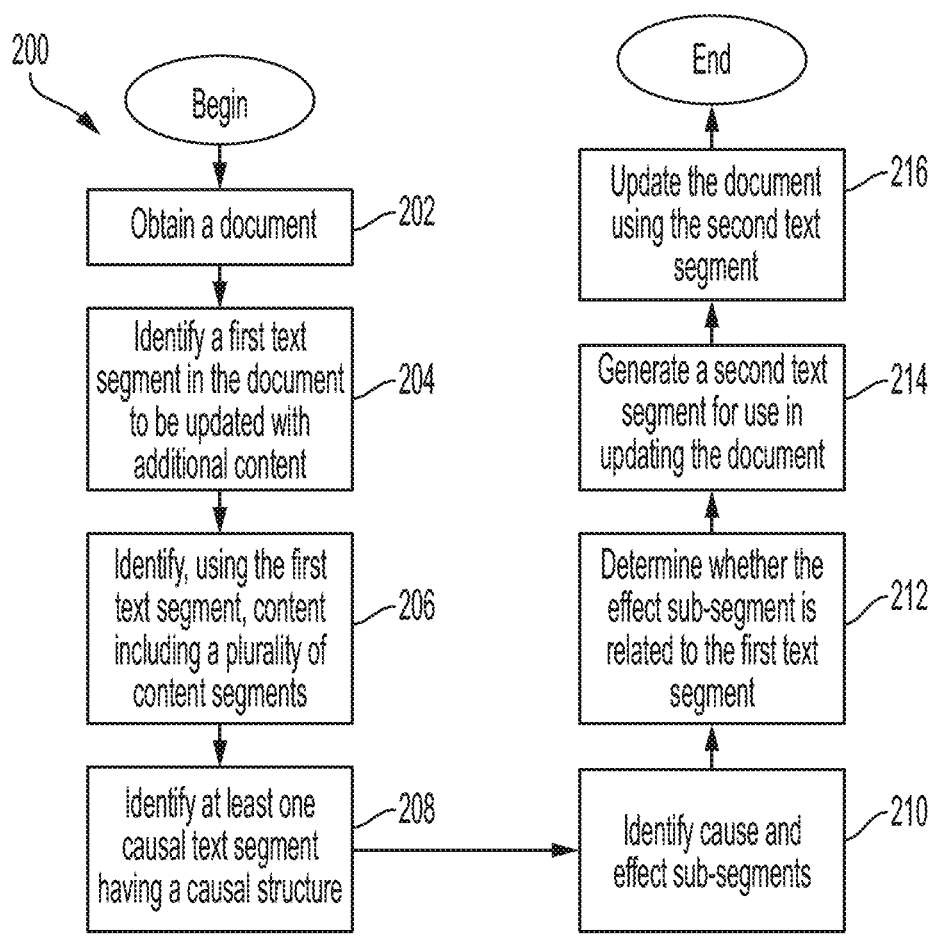
FIG. 2 is a flowchart of an example process for updating document content, in accordance with some embodiments of the technology described herein.

FIG. 2 is a flowchart of an illustrative process for updating document content, in accordance with some embodiments of the technology described herein. In some embodiments, document updating system 101 performs the illustrative process of FIG. 2, though the process may be performed with any suitable module of an NLG engine. The acts of process 200 may be performed in the order depicted in FIG. 2, or in any other suitable order. In some embodiments, one or more acts of process 200 may be omitted.

At the beginning of process 200, document updating system 101 may launch a session for a particular user, thereby associating information later obtained during the session to that particular user. Document updating system 101 may organize information obtained from different users into accounts. Each user has access to an account, and has the ability to interact with document updating system 101 through the account. As a result, document updating system 101 can maintain a record of information obtained from a user over multiple sessions. An account may be associated with individuals, or alternatively, with groups of individuals. In some embodiments, for example, multiple users affiliated with a particular organization can share an account.

At act 202, document updating system 101 may obtain a document to be updated (e.g., augmented) with additional content. Document updating document unit 101 may obtain the document from user 10 via GUI module, from NLG engine 100 via NLG engine interface module 124, or from any other source. The document may include natural language text. In one example, the document includes a report including natural language text describing the financial status of a particular company or a particular industry. However, the technology described herein is not limited to any particular type of document. FIG. 3 depicts a representative document that may be obtained at act 202. This document includes a financial indicator table 302, a balance sheet table 304 and a report preview section 306. Financial indicator table 302 displays several financial indicators associated with a particular company for fiscal years 2018 and 2019. Balance sheet table 304 displays the company's balance sheet as of December 31 of fiscal years 2017, 2018 and 2019, as well as variations expressed in percentages. Report preview section 306 includes natural language text describing the financial status of the company. This natural language text may be generated using an NLG engine (e.g., NLG engine 100), for example on the basis of the content of financial indicator table 302 and balance sheet table 304.

At act 204, text segment identification module 112 may identify one or more text segments in the document to be updated with additional content. A text segment may include words disposed contiguously. For example, a text segment may include a sentence or a set of contiguous sentences. However, not all text segments need be contiguous. Some text segments, for example, may include text from a first paragraph and text from a second paragraph, where the first and second paragraph may or may not be contiguous. Further, not all text segments include complete sentences. Some text segments, for example, include portions of sentences.

In some embodiments, text segment identification module 112 can identify text segments using a manual approach, an automatic approach, or a mixed (both manual and automatic) approach. The manual approach may involve allowing the user to select text segment(s) to be updated with additional content. For example, text segment identification 112 may cause GUI module 110 to present a GUI 14 which user 10 may use to select one or more text segments of a document. The automatic approach may involve selecting one or more text segments without input from the user. In some embodiments, this may be done using rules. One rule involves identifying text segments that are associated to particular semantic objects. Aspects of semantic objects are described in U.S. Patent Application Publication No. 2020/0356732 titled "NATURAL LANGUAGE TEXT GENERATION USING SEMANTIC OBJECTS," which is herein incorporated by reference in its entirety. For example, text segment identification module 112 may identify text segments that are associated to the sematic object Describe Value or to the semantic object Describe Variation. The semantic object Describe Value may include the following attributes: subject (e.g., sales), verb (e.g., were), value (e.g., $200,000), time (e.g., in 2018). The semantic object DescribeVariation may include the following attributes: subject (e.g., sales), verb (e.g., increased), variation (e.g., by 12%), time (e.g., in 2018).

As an example, one class of rules is defined in the context of financial documents. One rule of this class involves selecting text segments that include a particular financial indicator, such as sales, profits, losses, earnings before interest and taxes (EBIT), earnings before interest, taxes, depreciation and amortization (EBITDA), net income, share of associates, etc. Another rule of this class involves identifying trigger conditions. One condition may be triggered, for example, when a financial indicator is within a certain range, when a financial indicator exhibits a variation that is within a certain range, or when a financial indicator exhibits a predefined pattern. Applying these rules involves identifying text segments in the document describing financial indicators that satisfy a trigger condition. FIG. 4A is a table displaying four representative rules to be used in the context of financial documents, in accordance with some embodiments. In this example, the rules include a section, a financial indicator, a semantic object, and a trigger condition. Of course, not all rules of the types described herein are limited to this particular scheme. Other rules, for example, may include some but not all the fields depicted in FIG. 4A. The section field indicates the document in which text segments are to be identified. In this example, text segments are to be identified in a document named "income statement." The semantic object field indicates that text segment identification module 112 is to consider text segments associated with the rule's semantic object. The trigger condition field indicates that text segment identification module 112 is to consider text segments that satisfy the rule's trigger condition. The trigger condition of the second rule, for example, requires that the corresponding financial indicator (EBIT) exhibit a recurrent variation that is between −15% and +15%. Further, the trigger condition of the fourth rule requires that the corresponding financial indicator (shares of associates) exhibit a significant variation that is between −10% and +10%.

The mixed approach may involve automatically identifying text segments using one or more rules, and allowing the user to manually select one or more of the identified text segments. Referring back to FIG. 4A, the result field indicates what occurs when text segment identification module 112 identifies a text segment. In some embodiments, text segment identification module 112 selects the identified text segment, and process 200 proceeds to act 206 (this is an example of an automatic approach). In other embodiments, text segment identification module 112 causes GUI module 110 to display a warning message (this is an example of a mixed approach). Each rule of FIG. 4A causes display of a warning message. The warning description field indicates the warning message to be displayed.

FIG. 4B illustrates the document of FIG. 3 when the third rule of FIG. 4A is applied. In this example, text segment identification module 112 identifies two sentences. The first sentence is "Interest charge went down (146%) to €610K over the last fiscal year." The second sentence is "Non recurring result increased by €133K to €150K." The result of the application of this rule is that a first message warning is displayed next to the first identified sentence and a second message warning is displayed next to the second identified sentence.

In some embodiments, GUI module 110 may allow the user to select the text segment corresponding to the displayed warning message. For example, user 10 may select the sentence "Non recurring result increased by €133K to €150K." This may be achieved, for example, by presenting buttons on the GUI or by making the text itself clickable on the GUI. The selected sentence is further processed according to the subsequent acts of process 200.

Figure 4C:
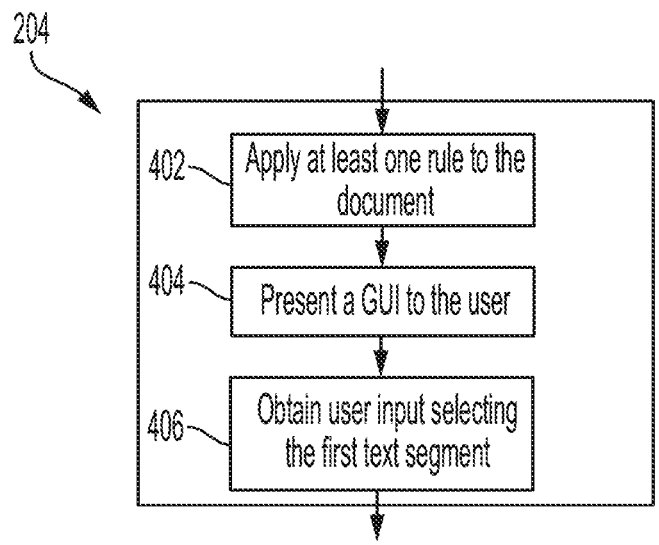
FIG. 4C is a flowchart of an example process for identifying text to be updated with additional content, in accordance with some embodiments of the technology described herein.

Accordingly, act 204 may include one or more sub-acts. Three representative sub-acts are depicted in FIG. 4C, in accordance with some embodiments. Act 402 involves applying at least one rule to the document to be updated. Examples of rules are described in detail above. Act 404 involves presenting a GUI to a user. In some embodiments, the GUI displays one or more warning messages. At act 406, text segment identification module 112 obtains user input selecting a text segment, for example, one of the text segments corresponding to one of the warning messages. In some embodiments, some (or all) the sub-acts of FIG. 4C may be omitted from act 204.

At act 206, content identification module 116 may identify, using the text segment(s) identified at act 204, content from at least one data source 140. Suitable data sources include, for example, databases containing publicly available information. Referring to financial documents, as an example, a possible data source is the database administered by the Security and Exchange Commission (SEC). Another possible data source is the database administered by the Thomson Reuters Corporation. In this act, content identification module 116 may search data source(s) 140 for one or more key words or key phrases. One key word may be a financial indicator (e.g., net income) appearing in the identified text segment. Another key word may be the value of a financial indicator (e.g., €150K) appearing in the identified text segment. Another key word may be the name of the company to which the document relates.

Figure 4D:
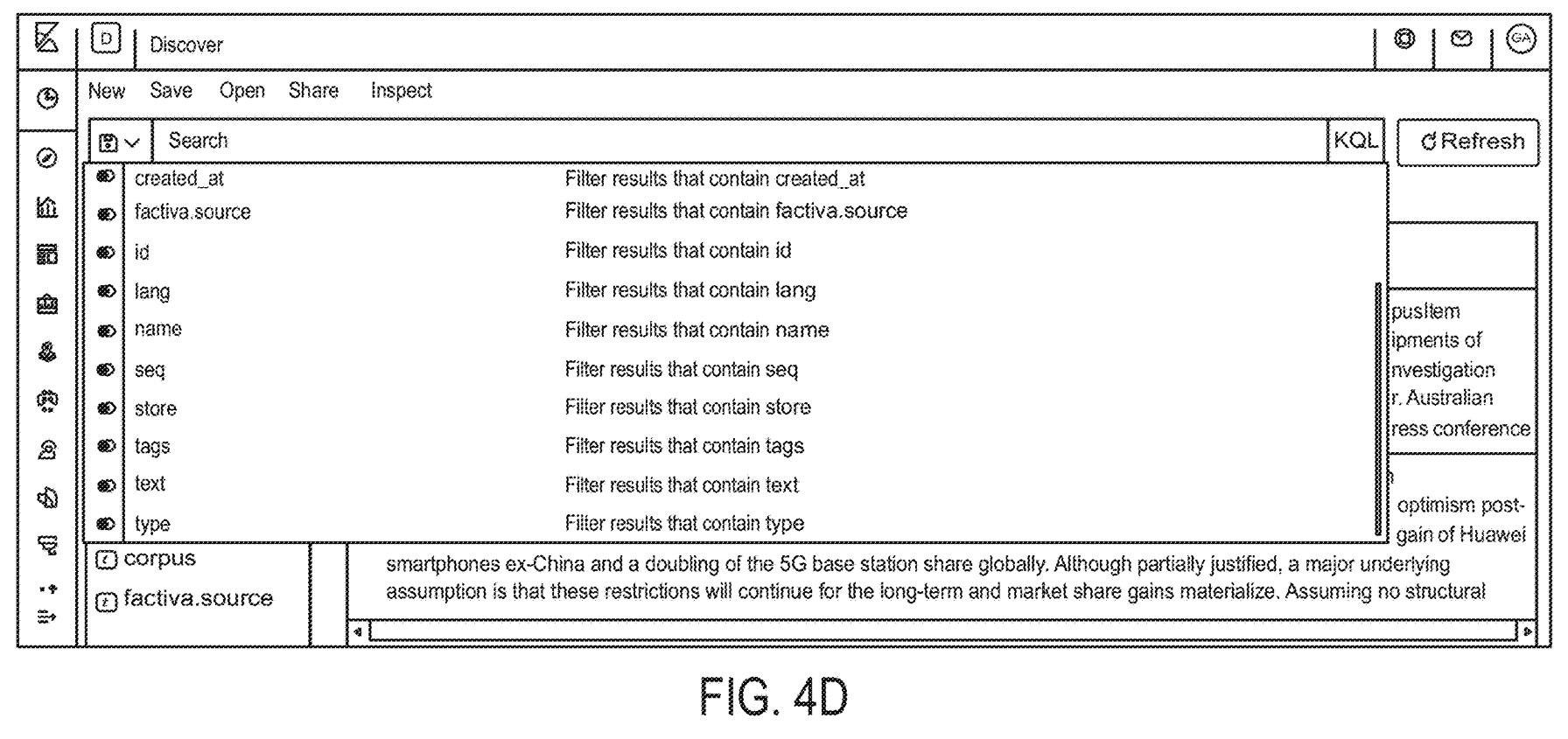
Figure 4E:
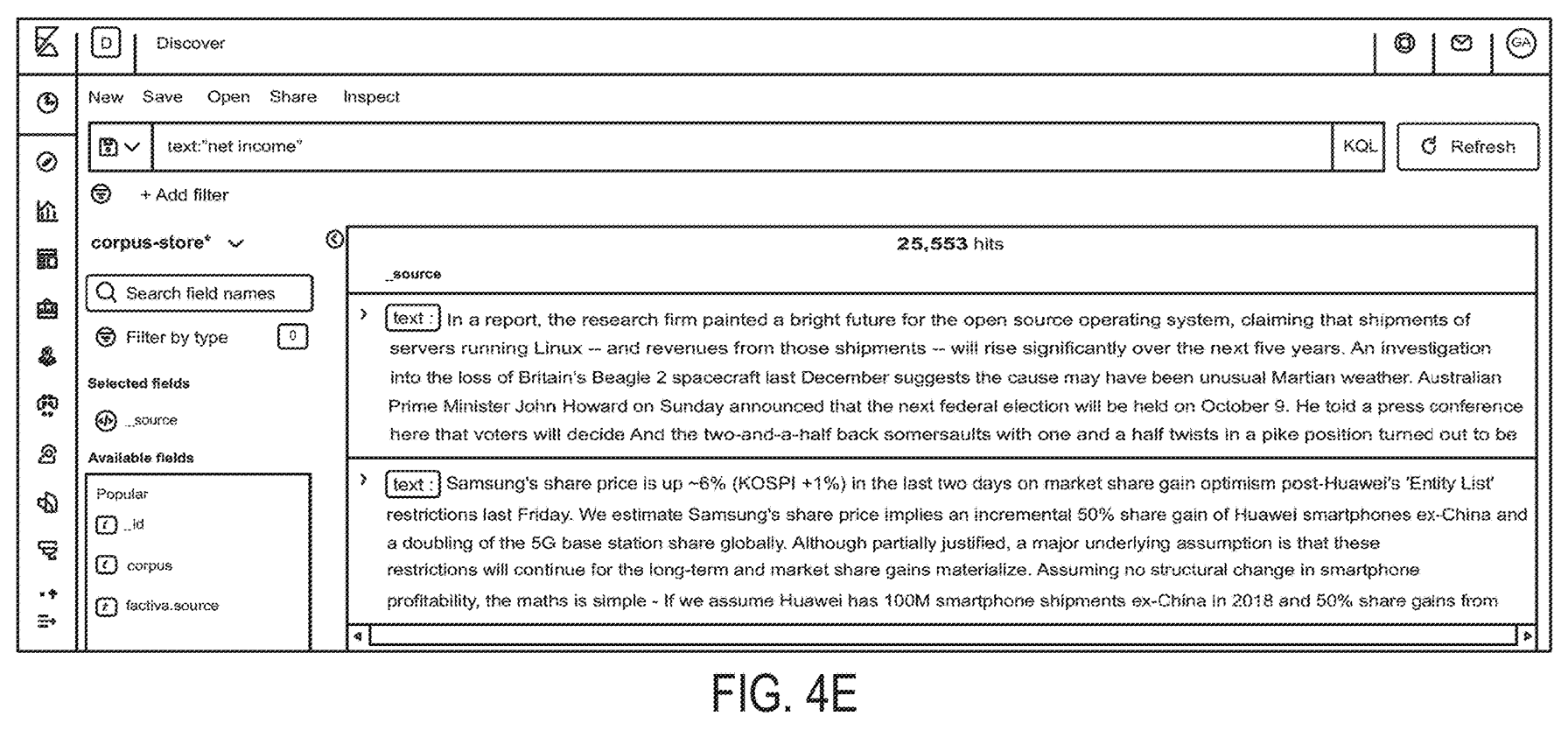

Consider, for example, a case in which the user selects the second warning message of FIG. 4B. This warning message is linked to the income statement section of the report, the net income financial indicator, the year 2019 for which the Net income value is provided, and the Acme Corp. company. Accordingly, content identification module 116 searches data source(s) 140 to identify these elements. An equivalence of the search API is provided in FIGS. 4D-4E, which is obtained from the Kibana UI wrapping the Elasticsearch DB for net incomes. From this search, the following fragment is matched from meta-data: net income and synonyms (e.g., net earnings), operating profits, Acme Corporation, variation: positive, date: 2019. By way of example, at act 206, content identification module 116 identifies the content illustrated in FIG. 5. Additional details in connection with act 206 are described further below.

At act 208, causality detection module 116 may identify, from the content identified at act 206, at least one text segment having a causal structure. Text segments having a causal structure are, for example, text segments that include a cause sub-segment and a related effect sub-segment. A causal structure exists between two events if the occurrence of the first causes the occurrence of the second event. A causal structure exists even if the first event is a concurrent cause of the second event. Act 208 may involve a machine learning model in some embodiments.

As described in detail further below, in some embodiments, identifying a text segment having a causal structure may involve a tokenization. For example, at least some of a plurality of content segments are tokenized to produce a plurality of tokens. A bi-directional encoder representations and transformers (BERT) tokenizer may be used in some embodiments, though not all tokenizers are limited in this respect. The tokens are provided as input to the machine learning model to obtain an output indicative of whether the at least some of the plurality of content segments has a causal structure.

In some embodiments, the machine learning model of act 208 may comprise a binary classifier configured to identify whether a content segment has a causal structure. The classifier may comprise, for example, a neural network (e.g., a recurrent neural network). In some embodiments, a recurrent neural network comprises a long short-term memory (LSTM) neural network (e.g., a bi-directional LSTM neural network).

FIG. 6 illustrates the content identified at act 206. Two causal text segments are highlighted in FIG. 6. These are the sentences that, in this example, causality detection module 116 has identified as having a causal structure.

At act 210, cause and effect extraction module 118 may identify cause and effect sub-segments of the causal text segment identified at act 208. This act may be performed using another machine learning model different from the machine learning model used at act 208. Referring to the example of FIG. 6, cause and effect extraction module 118 identifies a cause sub-segment and an effect sub-segment for the first identified causal text segment and further identifies a cause sub-segment and an effect sub-segment for the second identified causal text segment. The resulting cause and effect sub-segments are depicted in FIG. 7. The first cause sub-segment recites "an increase in operating income and decreases in interest and payroll expenses." The first effect sub-segment recites "The increase in net income." The first cause sub-segment and the first effect sub-segment are in a causal relationship to each other. In fact, the occurrence of the event described in the cause sub-segment caused the occurrence of the event described in the effect sub-segment. Similarly, the second cause sub-segment and the second effect sub-segment are in a causal relationship to each other. The second cause sub-segment recites "an increase in origination fees resulting from an increase in the rate of loan turnover." The second effect sub-segment recites "The increase in revenue."

As described in detail further below, in some embodiments, identifying cause and effect sub-segments of a causal text segment may comprise a tokenization. For example, cause and effect extraction module 118 may tokenize a causal text segment to produce a plurality of tokens. Cause and effect extraction module 118 may further generate a plurality of tags by tagging the plurality of tokens, for example in accordance with an inside, outside, beginning (IOB) format. The plurality of tokens and associated tags may be provided as input to a machine learning model (different from the machine learning model of act 208) to obtain an output indicating the cause and effect sub-segments. In some embodiments, this machine learning model comprises a neural network (e.g., a recurrent neural network). In some embodiments, the recurrent neural network comprises a long short-term memory (LSTM) neural network (e.g., a bi-directional LSTM neural network). In some embodiments, the neural network comprises a conditional random field (CRF) model.

At act 212, effect aggregation module 120 may determine whether the effect sub-segment(s) identified at act 210 are related to the text segment(s) identified from the document at act 204. This act can be used to confirm whether the effect sub-segment is in fact relevant to the text segment to be updated with additional content. For example, at act 212, effect aggregation module 120 determines whether the effect sub-segment "the increase in net income" (see FIG. 7) is related to the text segment "Non recurring net income increased by €133K to €150K" (see FIG. 4B).

Figure 8:
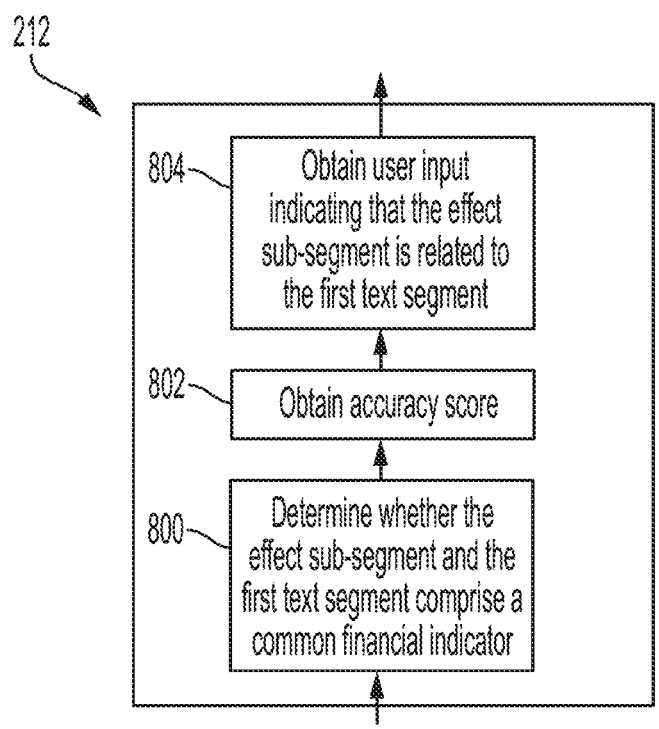
FIG. 8 is a flowchart of an example process for determining whether an effect sub-segment is related to a text segment of an input document, in accordance with some embodiments of the technology described herein.

In some embodiments, act 212 may include one or more sub-acts. Three representative sub-acts are depicted in FIG. 8, in accordance with some embodiments. At act 800, determining whether the effect sub-segment is related to the first text segment comprises determining whether the effect sub-segment and the first text segment comprise a common financial indicator. Referring again to the examples of FIGS. 4B and 7, effect aggregation module 120 may determine that the effect sub-segment and the text segment are related to each other because they both include text indicating the financial indicator "net income." In some embodiments, effect aggregation module 120 may determine that the effect sub-segment and the text segment are related even if the financial indicators do not match perfectly. For example, in some embodiments, effect aggregation module 120 may look for equivalent financial indicators, such as net income and net earnings.

At act 802, determining whether the effect sub-segment is related to the first text segment may comprise determining an accuracy score for the data source(s) and determining whether the effect sub-segment is related to the first text segment using the accuracy score. Scoring may be performed based on a variety of parameters, including for example on a measure of the reliability of the data source. For example, effect aggregation module 120 may assign the SEC database an accuracy score equal to 10 and may assign the Thomson Reuters database an accuracy score equal to 5. These accuracy scores indicate that the SEC database is deemed more reliable than the Thomson Reuters database. A typical ranking based on reliability of the data source may be, for example: 1) internal sources (broker own reports), 2) official reports (such as from the SEC database), and 3) news sources (e.g., Thomson Reuters or Bloomberg). Financial news sources, such as Bloomberg, may be given a higher score than general-purpose news feeds. The accuracy score may be based on other factors as well, including for example the number of data sources in which a match found (e.g., after deduplication).

Deduplication may be performed in some embodiments as part of act 212. In some embodiments, a simple word-based Levenshtein distance divided by the sentence length can provide a similarity score. Below a certain threshold, text segments are considered identical. The threshold parameter is set to a default value of 0.01 but can be tuned by the system administrator.

In some embodiments, a semantic weight may be computed. This may be performed using traditional term frequency-inverse document frequency (TF-IDF) scoring taking as reference all the documents gathered at the first query phase (see Elasticsearch significant term feature for a similar implementation). Word scores may be summed and divided by the length of each passage. This ensures that a text segment with frequent words or words that characterize the whole context (the company) get a lesser weight than text segments with very specific words.

At act 804, determining whether the effect sub-segment is related to the first text segment may comprise presenting a GUI 14 displaying a plurality of candidate effect sub-segments, and obtaining user input indicating that at least one of the candidate effect sub-segment has been selected. In some embodiments, effect aggregation module 120 may display numeric values indicating respective accuracy scores for each candidate effect sub-segment so that the user may make an informed selection based on the score.

At act 214, updated text generation module 122 may generate a new text segment for use in updating the document using the cause sub-segments identified at act 210 and at least one of the effect sub-segment identified at act 210 and the first text segment (the text segment identified at act 204). In some embodiments, a new text segment may be generated that combines the first text segment of the document with the cause sub-segment. Accordingly, the new sentence maintains at least some of the language appearing in the first text segment and further includes a cause sub-segment having a causal relationship with the first text segment. For example, referring back to the examples described above, the following text segment may be generated at act 214: "Non recurring net income increased by €133K to €150K due to an increase in operating income and decreases in interest and payroll expenses." In other embodiments, a new text segment is generated that combines the effect sub-segment with the cause sub-segment. In these embodiments, the effect sub-segment replaces the first text segment. For example, referring back to the examples described above, the following text segment may be generated at act 214: "This increase in net income was mainly due to an increase in operating income and decreases in interest and payroll expenses."

In some embodiments, act 214 may involve rephrasing of text. In some embodiments, in generating a new text segment, updated text generation module 122 may rephrase the first text segment and/or the cause sub-segment and/or the effect sub-segment. For example, instead of reciting the first text segment verbatim (or the effect sub-segment verbatim), the new text segment may include a rephrased version of it. Similarly, instead of reciting the cause sub-segment verbatim, the new text segment may include a rephrased version of it. In some embodiments, rephrasing text may involve paraphrasing. Accordingly, the new text segment expresses the same meaning expressed in the first text segment, but using different words and/or using different sentence structures. In other embodiments, however, the meaning of the first text segment may be slightly altered.

In some embodiments, act 214 may involve another machine learning model different from the machine learning model of act 208 and from the machine learning model of act 210. This machine learning model may be configured to generate the second text segment by rephrasing (e.g., paraphrasing) the cause sub-segment and/or the effect sub-segment and/or the first text segment. As described in detail further below, the machine learning model may comprise a neural network (e.g., a recurrent neural network). The neural network may comprise an LSTM neural network (e.g., a bi-directional LSTM).

In some embodiments, at act 214, updated text generation module 122 may cause GUI module 110 to output a GUI requesting input from the user. At this stage, updated text generation module 122 generates multiple new text segments and prompts the user to select one text segment for updating the document. An example of such a GUI is depicted in FIG. 9. As illustrated, GUI 900 includes two text segments. The first text segment recites "This increase in net income was mainly due to an increase in operating income and decreases in interest and payroll expenses." The second text segment recites "Successful launch of new product AcmeRocket had a short-term major effect on net income." Additionally, for each text segment, GUI 900 displays text indicating the source(s) from which content included in the respective text segment has been obtained. In this way, the user can assess for himself/herself the reliability of the content expressed in each text segment. GUI 900 may enable the user to select one of the text segments. For example, buttons may be provided next to respective text segments, or the text segments themselves may be clickable. The text segment that the user selects may be used to update the document.

At act 216, updated text generation module 122 may update the document using the new text segment generated at act 214. As described in connection with act 214, in some embodiments, the generated text segment comprises text corresponding to the cause sub-segment. In some such embodiments, act 216 involves adding the cause sub-segment (or a rephrased version of the cause sub-segment) to the document. For example, updated text generation module 122 may add the cause sub-segment (or a rephrased version of the cause sub-segment) to be in a causal relationship with the first text segment of the document.

As further described in connection with act 214, in some embodiments, the generated text segment may comprise text corresponding to the cause sub-segment as well as text corresponding to the effect sub-segment. In some such embodiments, act 216 involves replacing the first text segment of the document with the text segment generated at act 214. For example, updated text generation module 122 may replace the first text segment of the document with both the cause sub-segment (or a rephrased version of the cause sub-segment) and the effect sub-segment (or a rephrased version of the effect sub-segment). In the updated document, the cause sub-segment (or a rephrased version of the cause sub-segment) and the effect sub-segment (or a rephrased version of the effect sub-segment) may be in a causal relationship with each other.

FIG. 10 depicts an example of a document updated in accordance with act 216. In this case, following the first text segment "Non recurring result increased by €133K to €150K," updated text generation module 122 has added the causal text segment "an increase in operating income, decreases in interest and payroll expenses and successful launch of new product AcmeRocket." Additionally, updated text generation module 122 has added the causal conjunction "due to" to indicate that the first text segment is in a causal relationship with the cause sub-segment. Other causal conjunction may be used in other embodiments to indicate the existence of a causal relationship, including for example "because," "since," "as," "so," "as a result," "as a consequence," "consequently," "then," "hence," "therefore," "accordingly," "now that," "in this way," etc. GUI module 110 may share the updated document with the user.

III. Content Identification

As described above in connection with act 206, content identification module 114 identifies content to be used for updating a document from one or more data sources. In some embodiments, this act may involve a) searching and augmenting a database index (e.g., a federated database index) and b) linking index meta-data with a document using an entity linking model.

a. Searching and Augmenting a Database Index

An indexing process may be used to reconcile all (or some of the) meta-data. In some embodiments, an indexing process may be used to add more information where appropriate (e.g. missing information or information not sufficiently precise for use in updating documents). In some embodiments, reconciling meta-data may include aggregation, mapping and/or de-duplication. The output may be an annotated text information database (e.g., a federated database). It should be appreciated that, for performance issues, some parts of the input can be discarded at this stage, for example news not related to the target domain. One such database may contain text collected from online sources of a knowledge domain or purchased from a data broker. In some embodiments, content uploaded in the database is indexed, for example using one or more of the following: source, collection (e.g., bouquet) and/or collection date. This initial indexing may be augmented with sub-indexing. A sub-index can be extracted from meta-data provided by the original data sources or augmented from an entity linking model. A meta-data sub-index may include, for example, one or more of the following: entities (e.g., companies) related or quoted in the document, locations, dates, quantitative unit values and/or string index in the document for each meta-data. As the entity linking model is iterated (e.g., at regular times offline), a sub-index may be recomputed and augmented. Content and their meta-data are then stored in the database, allowing the system to build a sub-corpus by focusing on specific entities (e.g. {indicator:net earnings} AND {company:Acme} AND {date:2019}), optionally filtering by full-text expressions. The database may be implemented as a NoSQL database, such as an Elasticsearch instance with associated search engine and indexers, or using any other suitable database, as aspects of the technology described herein are not limited in this respect. Content identification module 114 may include, for example, a python API (e.g., elasticsearch_dsl) or a Java API (e.g., HDM) with full text search capabilities and meta-data search capabilities.

b. Linking Index Meta-Data with a Document Using an Entity Linking Model

Figure 4F:
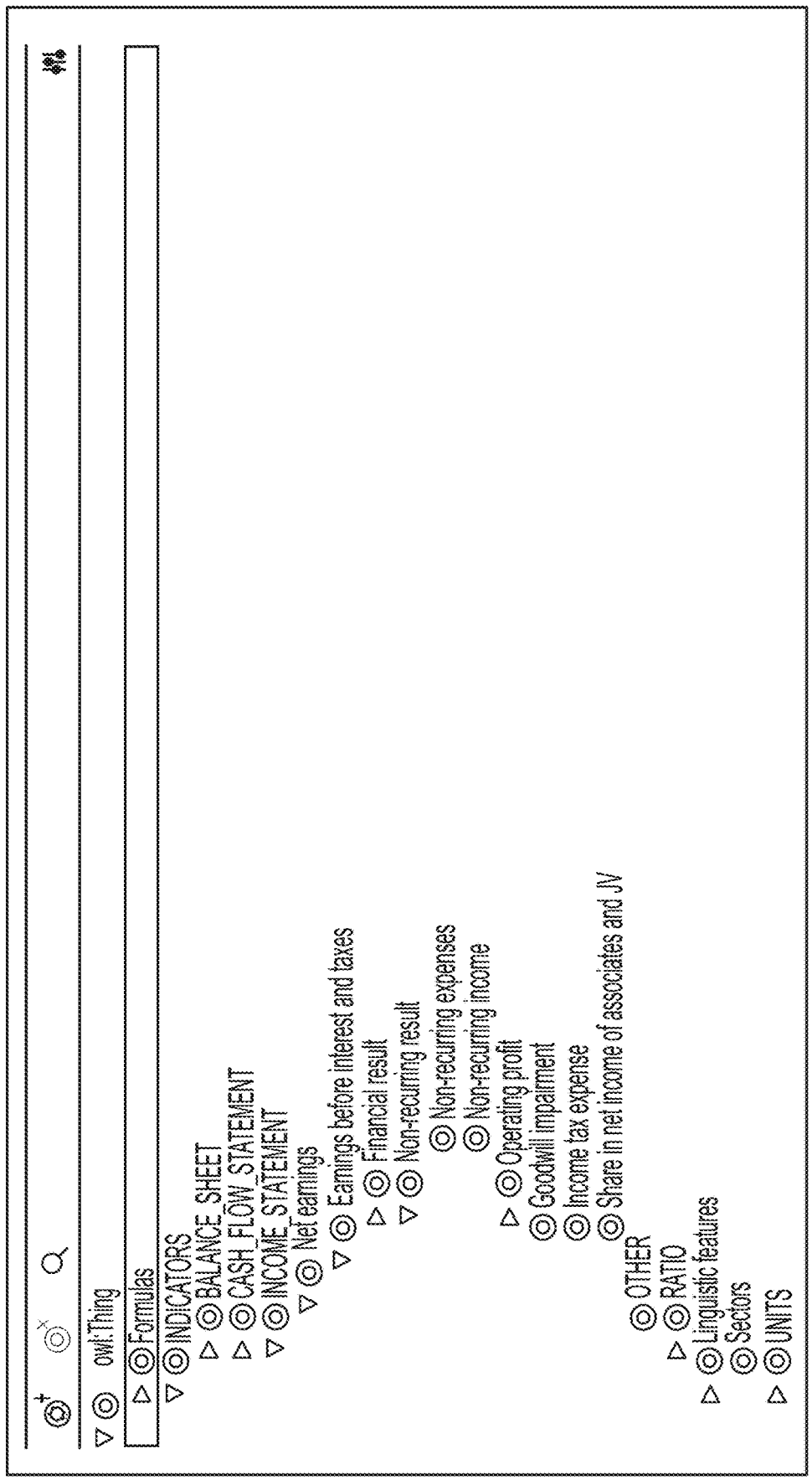
FIG. 4F illustrates an example of an ontology-based entity, in accordance with some embodiments of the technology described herein.

Once a database has been indexed, content identification module 114 may link index meta-data with a document. This may be done using an entity linking model. In some embodiments, the input for the entity linking model is a knowledge base initiated from reference dictionaries (such as companies, locations list, values units and/or grammars), ontology-based entities and/or rules. Reference dictionaries include text files containing reference labels and associated terms. For example, a reference dictionary for Acme may include Acme Corp. (reference label), Acme Corporation (Associated term) or ACorp (Associated term). Grammar dictionaries include text files containing lists of instances strongly associated with a semantic object. For example, a dictionary of predicates related to a variation may include "increase," "increases," "grow," "grows," "rise," and/or "rises." An example of an ontology-based entity is depicted in FIG. 4F.

In some embodiments, rules are evaluated against an ontology to determine whether indicators (e.g., financial indicators) exist in the reference labels or associated terms. Otherwise, indicators may be added to the knowledge base, either as a reference or as an associated term. The mapping act may a semi-automated process in some embodiments, depending on whether the indicator exists in the ontology or not. If the indicators do not exist in the ontology, it may be added manually to the ontology and to the knowledge base. Adding an ontology to the knowledge base enhances the ability to link the indicator targeted in a particular rule with the indicators declared at the same level (or at a level below) in the ontology.

In one example, if net income is declared as an indicator of income statement in a rules, the knowledge base will also associate net income with its reference label net earnings, and its hierarchical class income statement. As net earnings (and therefore net income) are associated with their hierarchical class income statement, the search engine may be able to scroll through the hierarchy associate with income statement as to also search for information related to EBIT, operating profits, financial result, etc. in the database index. In one example, the resulting knowledge base may include the following information: class, entity and alias. A class is the hierarchy with which an entity is associated. An entity is the reference label for an indicator. An alias is any associated term which can be used in lieu of an entity. In one example, the knowledge base may include:

| entity | entity_id | Index (start, top) | text_id | collection_id |
|---|---|---|---|---|
| income statement | 56 | 87959, 87975 | 133513 | broker_A |
| EBIT | 37 | 6321, 6325 | 1359915 | News_A |
| EBITDA | 89 | 8447, 8453 | 1354615 | Q10 |
| Net earnings | 125 | 76, 88 | 457541 | Q10 |
| Acme Corp. | 888975 | 4, 14 | 457541 | Q10 |
| EBITDA | 89 | 1312, 1318 | 1354615 | News_A |
| EBIT | 37 | 596491, 596495 | 98655 | broker_B |
| EBIT | 37 | 1256, 1260 | 5389445 | News_B |
| Net earnings | 125 | 588, 610 | 4575 | Q10 |
| Variation | 208 | 153, 161 | 477541 | Q10 |

This output may feed the index of the database. When content identification module 114 makes a content request,

| class | entity | aliases | entity_id |
|---|---|---|---|
| income statement | EBIT | earnings before interest and taxes | 37 |
| ratio | EBITDA | | 89 |
| income statement | net earnings | net income, NI, net profit | 125 |
| Income statement | Operating profits | Operating income | 136 |
| company | Acme Corp. | ACorp., Acme Corporation | 888975 |
| GPE | Paris | | 19713854 |
| UNIT | dollar | $, dollars | 75487778 |

In some embodiments, the role of an entity linking model may be to discover new possible associated terms with which to feed a named entity recognition process and to tag text accordingly. An entity linking model can be developed, for example, from Spacy API. The inputs for training the entity linking model may be in the following form:
  {"id": "125", "description": "Sales minus cost of goods sold, selling, general and administrative expenses, operating expenses, depreciation, interest, taxes, and other expenses."};
  {"alias": "net income", "entities": ["125"], "probabilities": [1.0]};
  {"alias": "NI", "entities": ["125"], "probabilities": [1.0]};
  {"alias": "net profit", "entities": ["125"], "probabilities": [1.0]}.

In some embodiments, entities and aliases may be turned into vectors, for instance from a BERT-base language model or Spacy large language model. The entity linking model may then parse all documents indexed in the database. Each document may be transformed into tokens and vectors, using the same language model as the one used for entities and aliases, as to compare the vector of the entities and aliases with similar vectors that could be find in the text. Their similarity is evaluated, for example, from a cosine similarity measure (though other measures are also possible). In some embodiments, if the cosine measure is greater than 0.9 (or other suitable values), new aliases may be added to the knowledge base. In one example, the entity linking model adds the following alias to the knowledge base: {"alias": "Net income", "entities": ["125"], "probabilities": [1.0]}.

In some embodiments, the entity linking model may in turn feed an entity ruler, which may be configured to associate the elements of the knowledge base with their occurrences in the database. The entity ruler or name entity recognition tool is used to precisely identify, in the stored data, which text contains the indicator for which the user wishes to obtain content. Scrapping rules of regex can also be used to identify a more complex expression.

The entity ruler or name entity recognition tool could be implemented using the Spacy API. In one example, the output of the entity linking model is as follows:

the keywords contained in the rule and associated with the request may be sent as an API request to the database index. Depending on the ontology hierarchy integrated in the knowledge base, a request may include net earnings, EBIT, operating profits, Acme Corp., variation and date. Relevant text identified using the API call may be stored in a temporary database.

IV. Machine Learning Models for Identifying Causal Structures

As described above in connection with act 208, a first machine learning model may be used to identify text segments having causal structures. In some embodiments, the machine learning model may include a binary classifier configured to determine whether portions of text segments are causal or not. Candidate causal text segments may be identified using the binary classifier, for example, according to the following rule: if a text segment is recognized as causal and the context (e.g., n preceding text segments and m subsequent text segments) contains one of the elements in the request, then a block of maximum n+m+1 text segments is extracted as a causal candidate (the causal sentence, plus the n preceding text segments plus the m subsequent text segments). This causality extraction tool may be built from data annotated according to a causal scheme from the corpus analysis phase. Deep learning techniques may be applied to the data manually extracted according to these schemes to reproduce human annotation and automatically identify the relevant causalities for a given keyword.

In one example, the training dataset contains 30.000 individuals, where the sampling is: 10% "1" and 90% "0." The training set is 80% of the whole dataset, the test set is 20%, split from stratified shuffling to maintain the same proportion of each label in both train and test sets. Data may have the following format:

| Text | Is Causal |
|---|---|
| Electric vehicle manufacturers, components for the vehicles, batteries and producers for charging infrastructure who invest over Rs 50 crore and create at least 50 jobs stand eligible for total SGST (State GST) refund on their sales till end of calendar year 2030 | 0 |
| In case where SGST refund is not applicable, the state is offering a 15% capital subsidy on investments made in Tamil Nadu till end of 2025 | 1 |

The binary classifier may be trained from a BiLS™ with attention model (also referred to as the "Transformer"). The parameters for the training architecture are the following:
Epochs: 100
Minimum Batches: 8
Minimum number of LSTM neurons: 64
Optimizer: Adam
The following transformations may be applied to the data:
Data may be tokenized with a Byte Pair Encoding tokenizer for performance optimization, and initiated on the ensemble vocabulary of the initial database.
The tokenized inputs may be embedded as tensors and passed to a Transformer language model.
F1 score on test set is 98.25, which is sufficient to validate the process. An example implementation of the model can be as follows:
A BERT tokenizer applied on the corpus as to insert mask tokens in text segments having a maximum length set to 512.
In some embodiments, the last layer of this BERT model is retrained for fine tuning on the binary task, for example with following training parameters, cross entropy and Adam optimizer.
A BERT base uncased language model with original twelve hidden layers, twelve attention heads and one hundred ten million parameters may be used.
In some embodiments, the neural network comprises at least ten million parameters. In some embodiments, the neural network comprises at least fifty million parameters. In some embodiments, the neural network comprises between ten million and two hundred million parameters. In some embodiments, the neural network comprises between fifty million and two hundred million parameters. In some embodiments, the neural network comprises at least six hidden layers. In some embodiments, the neural network comprises at least eight hidden layers. In some embodiments, the neural network comprises at least ten hidden layers. In some embodiments, the neural network comprises at least twelve hidden layers. In some embodiments, the neural network comprises at least six attention headers. In some embodiments, the neural network comprises at least eight attention headers. In some embodiments, the neural network comprises at least ten attention headers. In some embodiments, the neural network comprises at least twelve attention headers. In one example, the neural network comprises twelve hidden layers, twelve attention headers, and approximately one hundred ten million parameters.

V. Machine Learning Models for Identifying Cause and Effect Sub-Segments

As described above in connection with act 210, a second machine learning model may be used to identify cause and effect sub-segments. In some embodiments, the second machine learning model includes a bi-directional LSTM architecture. An example was conducted in the finance domain with a training set of 3000 examples, and with data having the following format:

| Text | Cause | Effect |
|---|---|---|
| Boussard Gavaudan Investment Management LLP bought a new position in shares of GENFIT S A/ADR in the second quarter worth about $199,000. Morgan Stanley increased its stake in shares of GENFIT S A/ADR by 24.4% in the second quarter. Morgan Stanley now owns 10,700 shares of the company's stock worth $211,000 after purchasing an additional 2,100 shares during the period | Morgan Stanley increased its stake in shares of GENFIT S A/ADR by 24.4% in the second quarter | Morgan Stanley now owns 10,700 shares of the company's stock worth $211,000 after purchasing an additional 2,100 shares during the period. |
| Zhao found himself 60 million yuan indebted after losing 9,000 BTC in a single day (Feb. 10, 2014) | losing 9,000 BTC in a single day (Feb. 10, 2014) | Zhao found himself 60 million yuan indebted |

The text inputs were tokenized and tagged according to the following IOB scheme:
Start Cause: B-C
Cause: C
Stop Cause: E-C
Start Indifferent: I
Indifferent: I
Stop Indifferent: I
Start Effect: B-E
Effect: E
Stop Effect: S-E
In one example, the sentence "Zhao found himself 60 million yuan indebted after losing 9,000 BTC in a single day (Feb. 10, 2014)" is tokenized. The causes and effects are tokenized as follows:
Cause: losing, 9,000, BTC, in, a, single, day, (, Feb. 10, 2014,)
Effect: Zhao, found, himself, 60, million, yuan, indebted.

Accordingly, the sentence is tagged according to the IOB scheme as follows: B-E, E, E, E, E, E, S-E, I, B-C, C, C, C, C, C, C, C, C, C, C, C, S-C.

In some embodiments, the model input includes, for each token, one or more of the following:
- guid: Unique id for the example.
- token: string. The tokenized element in the sequence.
- pos: string. The POS (part of speech) tag of the token.
- chunk: string. The chunk tag of the token.
- ner: string. The NER (named entity) tag of the token.
- iob: string. The IOB tag of the token is specified for training and examples.

These elements may be serialized for each sentence to feed a bi-directional LSTM CRF model according to the following architecture:
- Each input token may be mapped with the input text to a fixed-size dense vector.
- Text may be embedded at character level to feed a first bi-directional LSMT layer.
- A second bi-directional LSMT layer may encode sequential relations between word representations (e.g., word level embedding).
- An affine transformation may map the output of the bi-directional LSMT model to the class space.
- The score outputs of the bi-directional LSMT model may serve as inputs to a CRF layer.

Figure 11:
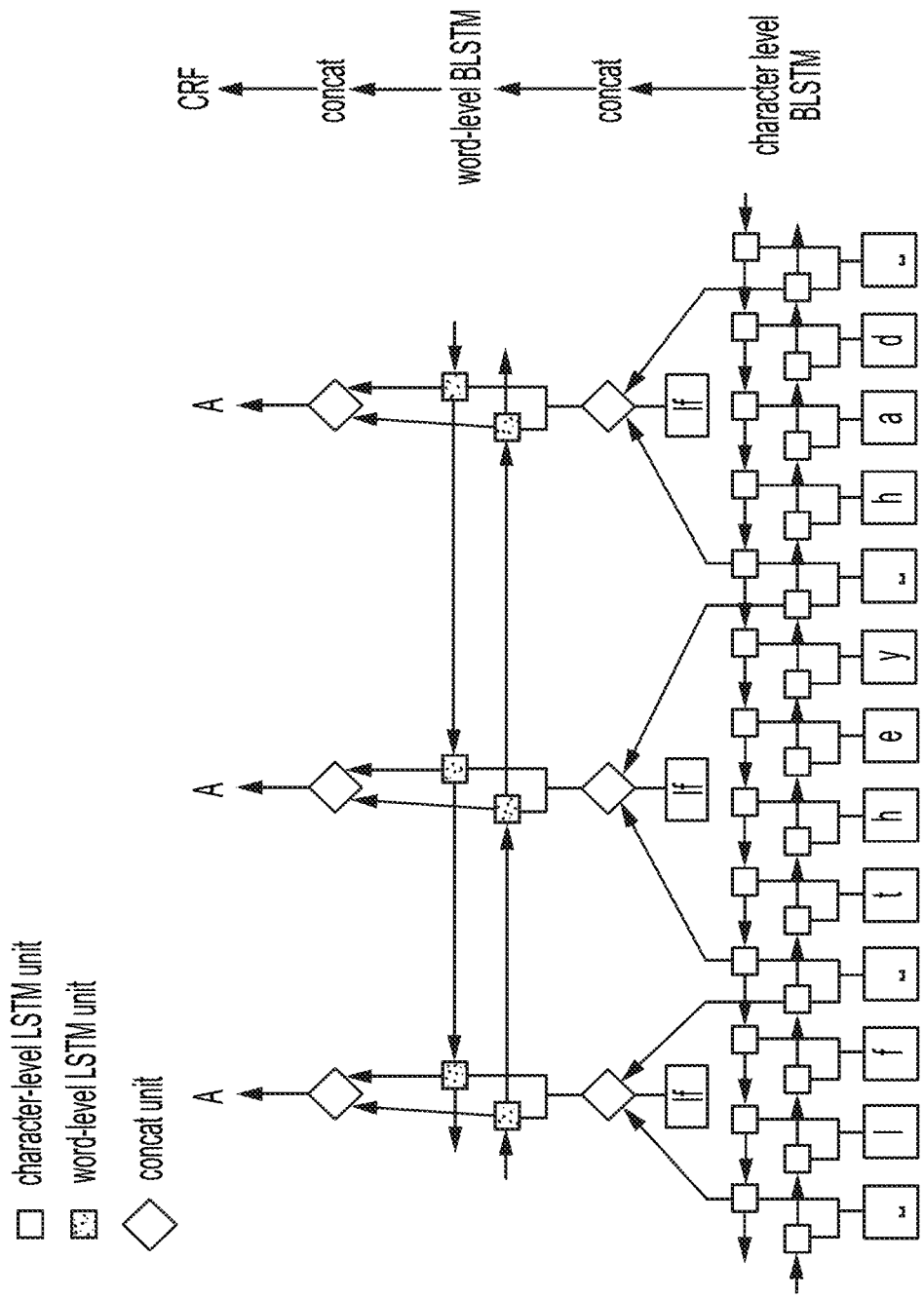
FIG. 11 is a block diagram illustrating an example architecture of a machine learning model configured to identify cause and effect sub-segments, in accordance with some embodiments of the technology described herein.

An example of such an architecture is depicted in FIG. 11. In one example, the F1 score is 86.25, which is sufficient to validate the process. In some embodiments, an implementation of the model includes a large transformer language model (e.g., BERT or RoBERTa language models) augmented with a CRF layer and optimized with an Adam optimizer and dropout. In some embodiments, the last layer of these large language models is retrained. A SoftMax layer may be added on top of the last layer as input to the CRF model. The training parameters for the CRF model may include LBFGS optimizer (optimizing), L1 constraint and/or L2 constraint.

VI. Machine Learning Models for Rephrasing Text Segments

As described above in connection with act 214, a third machine learning model may be used to rephrase text segments. In some embodiments, using the third machine learning model involves performing the following acts: 1) text segments are tokenized, for example using a Byte Pair Encoding tokenizer, initiated on the ensemble vocabulary of the initial database, 2) the tokenized inputs are embedded as tensors extracted from a large language or at character level model and are serialized, 3) the encoder and the decoder are linked using an attention mechanism, 4) the outputs of the attention mechanism are provided to a sentence extractor (e.g., sequence-to-sequence decoder).

In some embodiments, a sequence-to-sequence model may in combination with an attention network. In some embodiments, the model may comprise a reinforcement policy on the last layer to augment the accuracy of the decoder. In some embodiments, the parameters used for the training architecture may include an Adam optimizer, a cross entropy loss and/or a policy gradient algorithm (for reinforced learning). A T5 model may be used in some embodiments. In one example, the last layer of the T5 model includes an AdamW optimizer, trained on maximum sequence length between 256 and 1024 (e.g., 512) and initial learning rate between $1e^{-3}$ and $1e^{-5}$ (e.g., $3e^{-4}$).

VII. Implementation Details

Figure 12:
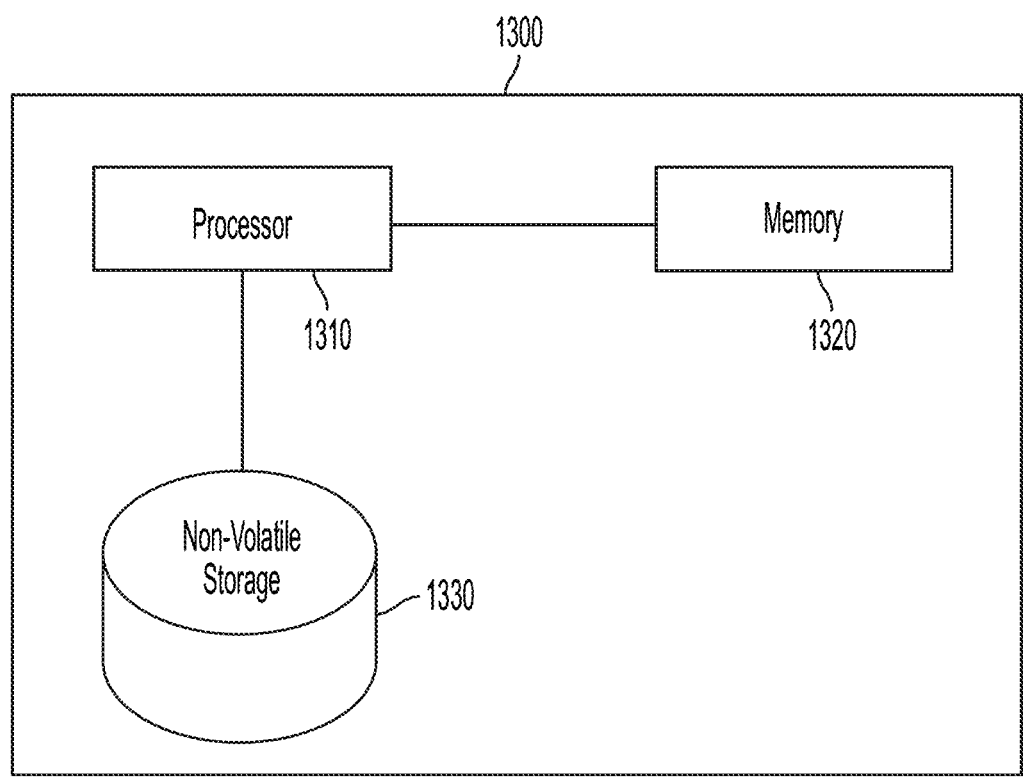
FIG. 12 is a block diagram of an illustrative computer system that may be used in implementing some embodiments.

An illustrative implementation of a computer system 1200 that may be used in connection with any of the embodiments of the disclosure provided herein is shown in FIG. 12. The computer system 1200 may include one or more processors 1210 and one or more articles of manufacture that comprise non-transitory computer-readable storage media (e.g., memory 1220, one or more non-volatile storage media 1230, etc.). The processor 1210 may control writing data to and reading data from the memory 1220 and the non-volatile storage device 1230 in any suitable manner, as the aspects of the disclosure provided herein are not limited in this respect. To perform any of the functionality described herein, the processor 1210 may execute one or more processor-executable instructions stored in one or more non-transitory computer-readable storage media (e.g., the memory 1220), which may serve as non-transitory computer-readable storage media storing processor-executable instructions for execution by the processor 1210.

The terms "program" or "software" are used herein in a generic sense to refer to any type of computer code or set of processor-executable instructions that can be employed to program a computer or other processor to implement various aspects of embodiments as described above. Additionally, it should be appreciated that according to one aspect, one or more computer programs that when executed perform methods of the disclosure provided herein need not reside on a single computer or processor, but may be distributed in a modular fashion among different computers or processors to implement various aspects of the disclosure provided herein.

Processor-executable instructions may be in many forms, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

Also, data structures may be stored in one or more non-transitory computer-readable storage media in any suitable form. For simplicity of illustration, data structures may be shown to have fields that are related through location in the data structure. Such relationships may likewise be achieved by assigning storage for the fields with locations in a non-transitory computer-readable medium that convey relationship between the fields. However, any suitable mechanism may be used to establish relationships among information in fields of a data structure, including through the use of pointers, tags or other mechanisms that establish relationships among data elements.

Also, various inventive concepts may be embodied as one or more processes, of which examples has been provided. The acts performed as part of each process may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, and/or ordinary meanings of the defined terms.

Use of ordinal terms such as "first," "second," "third," etc., in the claims to modify a claim element does not by itself connote any priority, precedence, or order of one claim element over another or the temporal order in which acts of a method are performed. Such terms are used merely as labels to distinguish one claim element having a certain name from another element having a same name (but for use of the ordinal term).

The phraseology and terminology used herein is for the purpose of description and should not be regarded as limiting. The use of "including," "comprising," "having," "containing", "involving", and variations thereof, is meant to encompass the items listed thereafter and additional items.

Having described several embodiments of the techniques described herein in detail, various modifications, and improvements will readily occur to those skilled in the art. Such modifications and improvements are intended to be within the spirit and scope of the disclosure. Accordingly, the foregoing description is by way of example only, and is not intended as limiting. The techniques are limited only as defined by the following claims and the equivalents thereto.

What is claimed is:

1. A method for updating document content, the method comprising:
    using at least one computer hardware processor to perform:
        identifying a first text segment in a document to be updated with additional content;
        identifying, using the first text segment, content from at least one data source, the content including a plurality of content segments;
        identifying, using a first machine learning model and from among the plurality of content segments, at least one causal text segment having a causal structure, the at least one causal text segment including a first causal text segment;
        identifying, using a second machine learning model different from the first machine learning model, cause and effect sub-segments of the first causal text segment;
        generating a second text segment for use in updating the document by using the cause sub-segment; and
        updating the document using the second text segment.

2. The method of claim 1, wherein identifying the first text segment is performed using at least one rule for determining when content of the first text segment is to be augmented with additional content.

3. The method of claim 2, wherein identifying the first text segment using the at least one rule comprises determining that the first text segment is to be augmented with additional content when the first text segment includes text about a value of a financial indicator.

4. The method of claim 1, wherein the document comprises a plurality of text segments including the first text segment, wherein each of the plurality of text segments is associated with a respective semantic object, and wherein:
    identifying the first text segment in the document comprises identifying at least one of the plurality of text segments that is associated with a particular semantic object.

5. The method of claim 1, wherein identifying, using the first machine learning model and from among the plurality of content segments, the at least one causal text segment having a causal structure comprises:
    tokenizing at least some of the plurality of content segments to produce a plurality of tokens; and
    providing the plurality of tokens as input to the first machine learning model to obtain an output indicative of whether the at least some of the plurality of content segments has a causal structure.

6. The method of claim 1, wherein identifying, using the second machine learning model, cause and effect sub-segments of the first causal text segment comprises:
    tokenizing the first causal text segment to produce a plurality of tokens;
    generating a plurality of tags by tagging the plurality of tokens in accordance with an inside, outside, beginning (IOB) format; and
    providing the plurality of tokens and associated tags as input to the second machine learning model to obtain an output indicating the cause and effect sub-segments.

7. The method of claim 1, wherein generating the second text segment comprises using a third machine learning model different from the first machine learning model and from the second machine learning model.

8. The method of claim 7, wherein the third machine learning model is configured to generate the second text segment by paraphrasing the cause and effect sub-segments.

9. The method of claim 1, wherein generating the second text segment for use in updating the document by using the cause sub-segment comprises generating the second text segment for use in updating the document by using the cause sub-segment and at least one of the effect sub-segment and the first text segment.

10. A system for updating document content, the system comprising:
    at least one computer hardware processor to perform:
        identifying a first text segment in a document to be updated with additional content;
        identifying, using the first text segment, content from at least one data source, the content including a plurality of content segments;
        identifying, using a first machine learning model and from among the plurality of content segments, at least one causal text segment having a causal structure, the at least one causal text segment including a first causal text segment;
        identifying, using a second machine learning model different from the first machine learning model, cause and effect sub-segments of the first causal text segment;
        generating a second text segment for use in updating the document by using the cause sub-segment; and
        updating the document using the second text segment.

11. The system of claim 10, wherein identifying the first text segment is performed using at least one rule for determining when content of the first text segment is to be augmented with additional content.

12. The system of claim 11, wherein identifying the first text segment using the at least one rule comprises determining that the first text segment is to be augmented with additional content when the first text segment includes text about a value of a financial indicator.

13. The system of claim 10, wherein the document comprises a plurality of text segments including the first text segment, wherein each of the plurality of text segments is associated with a respective semantic object, and wherein:
    identifying the first text segment in the document comprises identifying at least one of the plurality of text segments that is associated with a particular semantic object.

14. The system of claim 10, wherein identifying, using the first machine learning model and from among the plurality of content segments, the at least one causal text segment having a causal structure comprises:

tokenizing at least some of the plurality of content segments to produce a plurality of tokens; and providing the plurality of tokens as input to the first machine learning model to obtain an output indicative of whether the at least some of the plurality of content segments has a causal structure.

15. The system of claim 10, wherein identifying, using the second machine learning model, cause and effect sub-segments of the first causal text segment comprises:

tokenizing the first causal text segment to produce a plurality of tokens;

generating a plurality of tags by tagging the plurality of tokens in accordance with an inside, outside, beginning (IOB) format; and providing the plurality of tokens and associated tags as input to the second machine learning model to obtain an output indicating the cause and effect sub-segments.

16. The system of claim 10, wherein generating the second text segment comprises using a third machine learning model different from the first machine learning model and from the second machine learning model.

17. The system of claim 10, wherein generating the second text segment for use in updating the document by using the cause sub-segment comprises generating the second text segment for use in updating the document by using the cause sub-segment and at least one of the effect sub-segment and the first text segment.

18. At least one non-transitory computer-readable storage medium storing processor-executable instructions that, when executed by at least one processor, cause the at least one processor to perform a method for updating document content, the method comprising:

identifying a first text segment in a document to be updated with additional content;

identifying, using the first text segment, content from at least one data source, the content including a plurality of content segments;

identifying, using a first machine learning model and from among the plurality of content segments, at least one causal text segment having a causal structure, the at least one causal text segment including a first causal text segment;

identifying, using a second machine learning model different from the first machine learning model, cause and effect sub-segments of the first causal text segment;

generating a second text segment for use in updating the document by using the cause sub-segment; and updating the document using the second text segment.

19. The at least one non-transitory computer-readable storage medium of claim 18, wherein identifying the first text segment is performed using at least one rule for determining when content of the first text segment is to be augmented with additional content.

20. The at least one non-transitory computer-readable storage medium of claim 18, wherein the document comprises a plurality of text segments including the first text segment, wherein each of the plurality of text segments is associated with a respective semantic object, and wherein:

identifying the first text segment in the document comprises identifying at least one of the plurality of text segments that is associated with a particular semantic object.

* * * * *

UNITED STATES PATENT AND TRADEMARK OFFICE
CERTIFICATE OF CORRECTION

PATENT NO. : 11,983,486 B1
APPLICATION NO. : 17/542755
DATED : May 14, 2024
INVENTOR(S) : Dominique Mariko et al.

It is certified that error appears in the above-identified patent and that said Letters Patent is hereby corrected as shown below:

On the Title Page

Item (71) Applicant:
"Applicant: YSEOP SA, Lyons (FR)"
Should read:
--Applicant: YSEOP SA, Lyon (FR)--

Item (73) Assignee:
"Assignee: YSEOP SA, Lyons (FR)"
Should read:
--Assignee: YSEOP SA, Lyon (FR)--

Signed and Sealed this
Second Day of July, 2024

Katherine Kelly Vidal
*Director of the United States Patent and Trademark Office*